United States Patent
Apte et al.

(10) Patent No.: US 10,606,573 B2
(45) Date of Patent: Mar. 31, 2020

(54) SYSTEM AND METHOD FOR COMPUTER LANGUAGE MIGRATION USING A RE-ARCHITECTURE TOOL FOR DECOMPOSING A LEGACY SYSTEM AND RECOMPOSING A MODERNIZED SYSTEM

(71) Applicant: Syntel, Inc., Troy, MI (US)

(72) Inventors: Abhijit Apte, Maharashtra (IN); Vivek Rao, Maharashtra (IN); Sagar Kulkarni, Maharashtra (IN); Prashant Ladha, Maharashtra (IN); Shashank Moghe, Navi Mumbai (IN); Vedavyas Rallabandi, Chennai (IN); Ravi Shankar, Maharashtra (IN); Lopamudra Dhal, Pune (IN); Prabhat Parey, Pune (IN); Rahul Mehra, Pune (IN); Amit Pundeer, Clifton, NJ (US); Abhishek Agarwal, Meerut (IN); Abhijeet Sheth, Mumbai (IN)

(73) Assignee: SYNTEL, INC., Troy, MI (US)

( * ) Notice: Subject to any disclaimer, the term of this patent is extended or adjusted under 35 U.S.C. 154(b) by 0 days.

(21) Appl. No.: 16/002,444

(22) Filed: Jun. 7, 2018

(65) Prior Publication Data
US 2018/0357055 A1    Dec. 13, 2018

Related U.S. Application Data

(60) Provisional application No. 62/516,367, filed on Jun. 7, 2017.

(51) Int. Cl.
*G06F 9/45* (2006.01)
*G06F 8/51* (2018.01)
(Continued)

(52) U.S. Cl.
CPC ............. *G06F 8/51* (2013.01); *G06F 8/34* (2013.01); *G06F 8/38* (2013.01); *G06F 8/73* (2013.01)

(58) Field of Classification Search
CPC .............. G06F 8/51; G06F 8/52; G06F 8/53
(Continued)

(56) References Cited

U.S. PATENT DOCUMENTS

| | | | | |
|---|---|---|---|---|
| 5,442,792 A | * | 8/1995 | Chun | G06N 5/022 717/155 |
| 5,768,564 A | * | 6/1998 | Andrews | G06F 8/33 707/999.101 |

(Continued)

FOREIGN PATENT DOCUMENTS

WO    2004077215 A2    9/2004

OTHER PUBLICATIONS

Zhong et al, "Mining API Mapping for Language Migration", ACM, pp. 195-204 (Year: 2010).*
(Continued)

*Primary Examiner* — Anil Khatri
(74) *Attorney, Agent, or Firm* — Miles & Stockbridge, P.C.

(57) ABSTRACT

A legacy-to-container (L2C) system converts a computer program in a procedural programming language to an object oriented programming language. The L2C system parses the procedural language to identify program variables and also program sub-elements, such as paragraphs in COBOL for example. The L2C system provides a user interface that allows the user to select which paragraphs should be converted into methods wherein the remaining non-selected paragraphs are to be converted into classes. The L2C system is configured to re-architect the procedural language by (i) creating normal object classes corresponding to the identified variables, (ii) creating methods for the user-selected paragraphs; and (iii) creating classes for the remaining non-selected paragraphs. The L2C further includes various wizards to further facilitate the re-architecting, such as a UI enrichment wizard, a code elimination wizard, and a database optimizer wizard, as well as a code de-duplication wizard, a microservices wizard, and a parallel processing wizard.

20 Claims, 15 Drawing Sheets

(51) Int. Cl.
  *G06F 8/73* (2018.01)
  *G06F 8/34* (2018.01)
  *G06F 8/38* (2018.01)

(58) Field of Classification Search
  USPC .................................................. 717/135–141
  See application file for complete search history.

(56) References Cited

U.S. PATENT DOCUMENTS

| | | | | |
|---|---|---|---|---|
| 5,974,256 | A * | 10/1999 | Matthews | G06F 8/41 717/118 |
| 6,108,660 | A * | 8/2000 | Ikeda | G06F 9/461 |
| 6,247,172 | B1 | 6/2001 | Dunn et al. | |
| 6,334,215 | B1 | 12/2001 | Barker et al. | |
| 6,425,118 | B1 * | 7/2002 | Molloy | G06F 8/51 717/136 |
| 6,523,170 | B1 * | 2/2003 | Cuomo | G06F 8/447 717/136 |
| 6,523,172 | B1 * | 2/2003 | Martinez-Guerra | G06F 8/427 704/9 |
| 6,654,950 | B1 * | 11/2003 | Barnishan | G06F 8/20 717/136 |
| 6,698,014 | B1 * | 2/2004 | Rechter | G06F 8/51 717/137 |
| 7,055,143 | B2 * | 5/2006 | Ringseth | G06F 8/20 717/131 |
| 7,127,707 | B1 * | 10/2006 | Mishra | G06F 8/423 717/137 |
| 7,152,229 | B2 * | 12/2006 | Chong | G06F 8/10 717/146 |
| 7,200,848 | B1 * | 4/2007 | Slaughter | H04L 63/101 709/202 |
| 7,240,338 | B1 * | 7/2007 | Bell | G06F 8/51 717/137 |
| 7,293,261 | B1 * | 11/2007 | Anderson | G06F 8/52 717/104 |
| 7,334,223 | B2 * | 2/2008 | Kumar | G06F 8/36 717/104 |
| 7,559,050 | B2 | 7/2009 | Burger | |
| 7,707,007 | B2 | 4/2010 | Campbell | |
| 7,809,547 | B2 | 10/2010 | Guenthner et al. | |
| 7,996,413 | B2 | 8/2011 | Cotichini et al. | |
| 8,438,551 | B2 * | 5/2013 | Tonkin | G06F 8/51 717/137 |
| 8,656,374 | B2 * | 2/2014 | Belyy | G06F 16/211 717/143 |
| 8,819,621 | B2 | 8/2014 | Naik et al. | |
| 8,881,100 | B2 | 11/2014 | Bohm et al. | |
| 10,127,026 | B2 * | 11/2018 | Kudriavtsev | G06F 8/51 |
| 2002/0178233 | A1 | 11/2002 | Mastrianni et al. | |
| 2005/0097521 | A1 | 5/2005 | Liu | |
| 2005/0262191 | A1 | 11/2005 | Mamou et al. | |
| 2006/0067436 | A1 | 3/2006 | Potkonjak et al. | |
| 2006/0277531 | A1 | 12/2006 | Horwitz et al. | |
| 2007/0050343 | A1 | 3/2007 | Siddaramappa et al. | |
| 2007/0067756 | A1 | 3/2007 | Garza | |
| 2008/0005619 | A1 | 1/2008 | Arons et al. | |
| 2008/0306986 | A1 | 12/2008 | Doyle, Sr. | |
| 2009/0064091 | A1 | 3/2009 | Tonkin et al. | |
| 2009/0164491 | A1 | 6/2009 | Cotichini et al. | |
| 2010/0107119 | A1 | 4/2010 | Libert et al. | |
| 2013/0339185 | A1 | 12/2013 | Johnson | |
| 2015/0089063 | A1 | 3/2015 | Soni et al. | |
| 2015/0331681 | A1 | 11/2015 | Rose et al. | |
| 2016/0070724 | A1 | 3/2016 | Marrelli et al. | |
| 2017/0116007 | A1 | 4/2017 | Cimadamore et al. | |
| 2017/0192758 | A1 | 7/2017 | Apte | |
| 2017/0192777 | A1 | 7/2017 | Apte | |
| 2017/0193437 | A1 | 7/2017 | Apte | |

OTHER PUBLICATIONS

Gunaseelan et al, "Distributed Eiffel: a language for programming multi-granular distributed objects on the Clouds operating system", IEEE, pp. 331-340 (Year:1992).*
Tobin-Hochstadt et al, "Interlanguage Migration: From Scripts to Programs", ACM, pp. 964-974 (Year: 2006).*
Nguyen et al, "Lexical Statistical Machine Translation for Language Migration", ACM, pp. 651-654 (Year: 2013).*
Hajjat et al, "Cloudward Bound: Planning for Beneficial Migration of Enterprise Applications to the Cloud", ACM, pp. 243-254 (Year: 2010).*
Matsuzawa et al, "Language Migration in non-CS Introductory Programming through Mutual Language Translation Environment", ACM, pp. 185-190 (Year: 2015).*
IBM Resource Access Control Facility (RACF), Resource Access Control Facility (1 pg), dated Nov. 2008.
CA ACF2 for z/OS, Quick Reference Guide (r 12) (3rd Edition, 101 pgs.), dated 2009.
Active Directory, Chapter 11 from Introducing Windows 2000 Server, Microsoft Press (18 pgs.), dated Dec. 9, 2009.
What's New in BMC Control-M 8, Product Data Sheet, (2 pgs.), dated Oct. 2012.
Application Analysis and Visualization—Micro Focus Enterprise Analyzer (2 pgs.), retrieved from https://archive.org/ web/ (Wayback Machine) with date of Jan. 16, 2014.
Application Analyzer: Technology Suite: TCS Master Craft: Offerings: Home (2 pgs.), retrieved from https://archive.org/ web/ (Wayback Machine) with date of Jan. 22, 2014.
Application Transformer: Transform Suite: TCS Master Craft: Offerings: Home (1 pgs.), retrieved from https:// archive.org/web/ (Wayback Machine) with date of Jan. 22, 2014.
Metalogic Systems, "Insight AMS" (2 pgs.), retrieved from https:// archive.org/web/ (Wayback Machine) with date of Mar. 16, 2014.
CA Unified Infrastructure Management—CA Technologies (6 pgs.), retrieved from https://archive.org/web/ (Wayback Machine) with date of Apr. 21, 2014.
McCabe Cyclomatic Complexity (2 pgs.), retrieved from https:// archive.org/web/ (Wayback Machine) with date of May 15, 2014.
Virtual Machinery—Sidebar 2—The Halstead Metrics (4 pgs.), retrieved from https://archive.org/web/ (Wayback Machine) with date of Sep. 23, 2014.
Accenture "Accenture Cloud Application Migration Services", A smarter way to get to the cloud (8 pgs.), dated 2014.
IBM Tivoli Workload Scheduler, User's Guide and Reference, Version 9, Release 2 (pp. 1-15), dated 2014.
IBM FileNet P8 Platform V 5.2.1 publication library (4 pg.), retrieved from https://archive.org/web/ (Wayback Machine) with date of Feb. 17, 2015.
Eranca "Solution" (5 pgs.), dated Mar. 10, 2015.
CA Top Secret—CA Technologies, Ensure Scalable and Streamlined Mainframe Security (4 pgs.), dated Jul. 29, 2015.
Rule Extraction Workbench: Transform Suite: TCS Master Craft: Offerings: TCS (2 pgs.), retrieved on-line on Oct. 15, 2015.
CA View—CA Technologies (6 pgs.), retrieved from https://archive.org/web/ (Wayback Machine) with date of Feb. 20, 2016.
CA Deliver—CA Technologies (6 pgs.), retrieved from https:// archive.org/web/ (Wayback Machine) with date of Feb. 27, 2016.
CA Workload Automation CA 7 Edition, CA Technologies (8 pgs.), retrieved from https://archive.org/web/ (Wayback Machine) with date of Feb. 27, 2016.
Migrate to Java—Making your transition to Java a smooth ride (6 pages), retrieved from http://www.e-zest.com:80/migrate-to-java/ (Wayback Machine) with date of Apr. 24, 2017.

* cited by examiner

SYSTEM AND METHOD FOR COMPUTER LANGUAGE MIGRATION USING A RE-ARCHITECTURE TOOL FOR DECOMPOSING A LEGACY SYSTEM AND RECOMPOSING A MODERNIZED SYSTEM

CROSS-REFERENCE TO RELATED APPLICATIONS

This application also claims the benefit of U.S. provisional application No. 62/516,367, filed 7 Jun. 2017 (the '367 application). The '367 application is hereby incorporated by reference as though fully set forth herein.

BACKGROUND a. Technical Field

The present disclosure relates generally to computerized systems and methods, and in particular, to a computerized system and method for computer language migration.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Most organizations have large and extremely complex information technology (IT) legacy systems which have been developed over the years through huge investments. The growing maintenance cost of the legacy application, the scarcity of skilled people with application expertise, the expected end-of-life announcements, the wearisome application deployment processes, and the platform dependencies are among the critical reasons for enterprise IT to migrate out of legacy applications (e.g., "Common business-oriented language" ("COBOL") language based programs) to modern "Everything as a Service" (EaaS) platform using Object Oriented (OO) technology such as Java™/.NET technology.

Typical enterprise IT migration software is directed toward converting application components (i.e., code) procedurally (i.e., line by line) and not into an object oriented implementation. In particular, the application components are typically converted line-by-line, without regard to the content of the application components or their impact to the application as a whole. The resulting conversion is therefore still procedural—like the original source—and not object oriented. As a result, typical software migration can be difficult to maintain due to the monolithic nature of the legacy application and due to the line-by-line migration, dead code is also converted, with no benefit to the enterprise. Performance of the migrated code may be affected due to the dead code migration. Additionally, the typical migration software does not include a screen (i.e., user interface—UI) enrichment facility for the enterprise (i.e., a wizard).

The foregoing discussion is intended only to illustrate the present field and should not be taken as a disavowal of claim scope.

SUMMARY

In embodiments consistent with the instant teachings, a legacy to container (L2C) computer-based re-architecture tool or system includes features such as automated wizard-based (i.e., interactive) facilities to migrate legacy languages (e.g., COBOL, Natural, Assembler, PL1, CAGEN, Visual Basic (VB)) and databases (e.g., Information Management System ("IMS"), DB2®, Adaptive Database System ("ADABAS"), Virtual Storage Access Method ("VSAM") into microservices based object oriented language (e.g., Java™, C #/.NET). In an embodiment, an incremental automated re-architect approach helps the user to convert the entire legacy application by remodeling the components to be converted using various wizards. In embodiments, the L2C system does not translate code blindly line-by-line with virtually no understanding of how the context of the code should shape its translation.

In an embodiment, a computerized method is provided for language migration of a computer program having first source code in a first, procedural-type programming language to second source code in a second, object-oriented programming language. The method includes the step of receiving the computer program having the first source code wherein the first programming language has a hierarchy structure with a plurality of levels wherein a top-level element includes at least a sub-element. In an embodiment, the first programming language comprises COBOL, the second programming language comprises Java™, and the sub-element comprises a COBOL paragraph. The method further includes parsing the first source code to identify at least (i) program variables and (ii) program sub-elements in the first source code. The method still further includes providing a conversion user interface to a user configured to present a listing (e.g., of certain ones of the sub-elements) based on the identified sub-elements and to receive an input from the user indicating the selection of sub-elements from the listing that are to be converted into methods in the second, object-oriented programming language.

The method also includes re-architecting the first source code by (i) creating normal object classes in the second source code in the second programming language that correspond to the identified variables, (ii) creating respective program methods in the second source code in the second programming language for the user-selected sub-elements; and (iii) creating respective program classes for a remainder of the listing of sub-elements not selected by the user.

In an embodiment, a computer system is also presented.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 14 is a simplified screen display showing the project explorer pane of the IDE, in an embodiment, with emphasis on Java™ classes.

FIG. 15 is a simplified screen display showing, in the detail pane of the IDE and in an embodiment, a Java™ class as converted.

FIG. 16 is a simplified screen display showing, in the detail pane of the IDE and in an embodiment, a Java™ method as converted.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Before proceeding to a detailed description of an embodiments for language migration, an overview of the legacy platform migration architecture will first be presented. In this regard, reference may also be made to U.S. application Ser. No. 15/397,492, filed 3 Jan. 2017 (hereinafter the '492 application), entitled "METHOD AND APPARATUS FOR INVENTORY ANALYSIS", U.S. application Ser. No. 15/397,486, filed 3 Jan. 2017 (hereinafter the '486 application), entitled "METHOD AND APPARATUS FOR BUSINESS RULE EXTRACTION", and U.S. application Ser. No. 15/397,473, filed 3 Jan. 2017 (hereinafter the '473 application), entitled "METHOD AND APPARATUS FOR MIGRATION OF APPLICATION SOURCE CODE". The '492 application, the '486 application, and the '473 application are all hereby incorporated by reference as though fully set forth herein.

Figure 1:
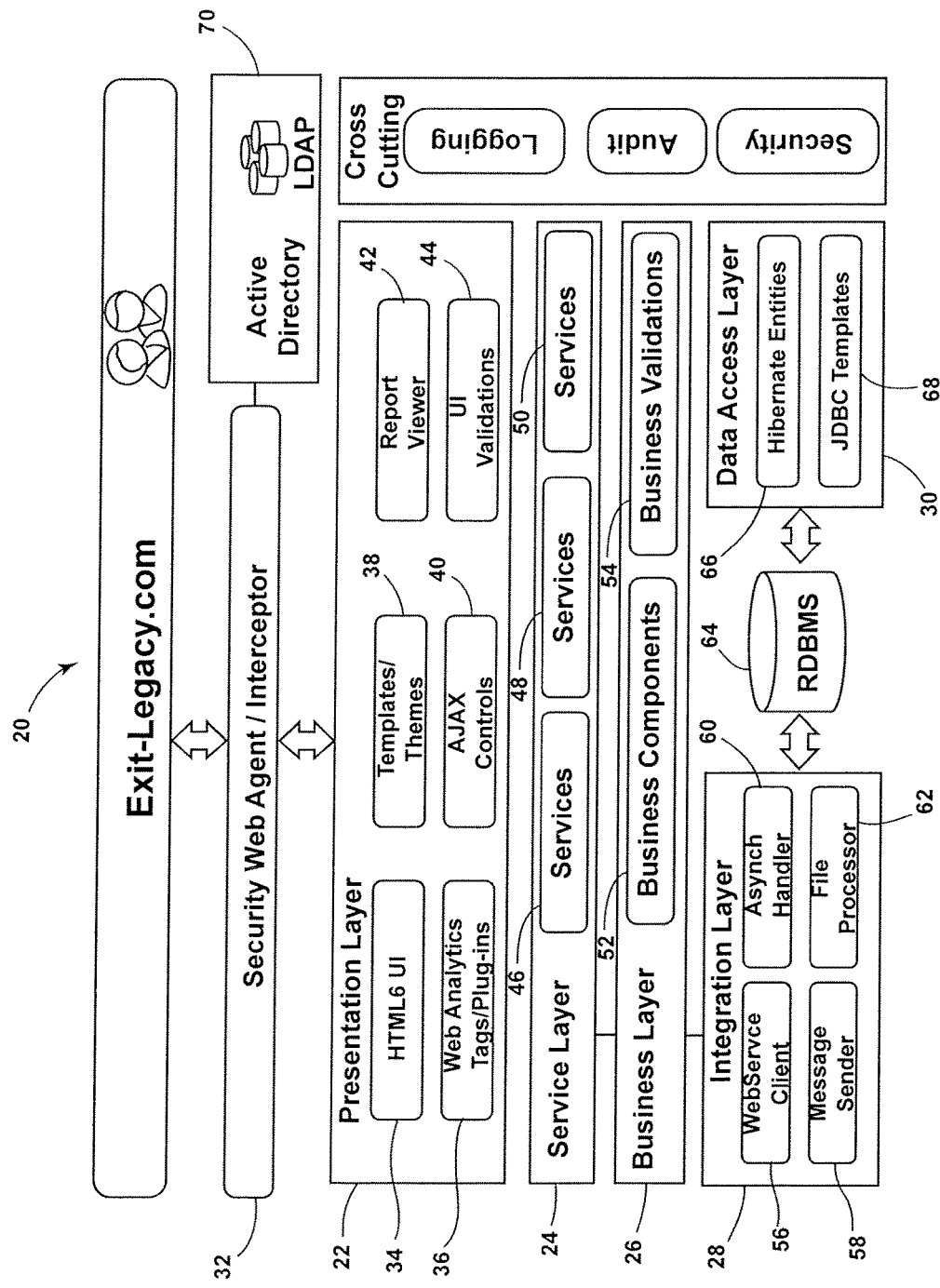
FIG. 1 is a simplified block diagram view showing an architecture of an embodiment for migrating a legacy application.

FIG. 1 is a simplified block diagram of a so-called exit legacy system 20 (also sometimes referred to herein as a Legacy-to-Container or "L2C" system) configured to assist a user (e.g., enterprise IT personnel) in migrating out of one or more legacy application(s) to an "Everything as a Service" (EaaS) platform. The following are some of the key benefits of migrating out of legacy applications: (i) removes or at least relieves the stranglehold of the legacy applications and the costs of leases/licenses for use of the legacy applications (e.g., vendor-imposed); (ii) allows transitioning to an EaaS platform by creating independent, highly maintainable service process application(s); and (iii) provides the enterprise with a plug-and-play, ready-to-run, modern service-based application architecture platform.

More generally, the system 20, in an embodiment, comprises an automated wizard-based (i.e., user interactive), re-architecture application for facilitating the migration of one or more legacy computer programming languages (e.g., COBOL, Natural, Assembler, PL1, CAGEN, Visual Basic (VB)) and/or databases (e.g., IMS, DB2®, ADABAS, VSAM) into a corresponding microservices-based object oriented programming language (e.g., Java™/C #.NET). The incremental automated re-architect approach assists the user in rewriting (i.e., migrating), one or more application(s) by remodeling the components of the source application(s) via, for example only, one or more user-driven wizards. As will become apparent, the system 20 is not configured to translate source code to target code blindly line-by-line with virtually no understanding of how the context of the code should shape its translation. Embodiments described herein address shortcomings of various known migration approaches.

Embodiments of the system 20 have various advantages, including without limitation: (i) the automated re-architecture will migrate legacy application(s) in its entirety; (ii) plural wizard-based automated tools that can be used multiple times to optimize and standardize the application code and the database; (iii) the resulting code of the migration will be object oriented and microservices-based code; and (iv) provides significant cost savings in hardware and software, which positions the user (e.g., enterprise IT) for continued growth and success. In sum, the system 20 (Exit-Legacy) may comprise, in an embodiment, a plug and play accelerator platform hosting various migration and modernization tools—a modernization lifecycle-based platform that helps getting out of legacy environment in a de-risked and accelerated way.

With continued reference to FIG. 1, the system 20 may be implemented in a layer-based architecture and may include the following components and/or layers such as a presentation layer 22, a service layer 24, a business layer 26, an integration layer 28, a data access layer 30, and a security component 32.

The presentation layer 22 may include a Hypertext Markup Language ("HTML") 5 UI block 34, a web analytics module 36, a template/theme module 38, an "AJAX" (Asynchronous Javascript™ and Extensible Markup Language ("XML") controls module 40, a report viewer module 42, and/or a user interface (UI) validations module 44. The HTML5 UI block 34 may be configured to render one or more user-discernable views and which may be implemented using conventional techniques, such as with a HTML5 user interface (UI), for example only. The web analytics module 36 provides legacy modernization the customer gets into a non-legacy distributed platform, for example, with enablement for cloud adoption, as well as digital and analytics capabilities. The templates/themes block 38 may be configured to provide velocity templating engines that may be used for generating any menus.

As should be appreciated, the well-known model-view-controller (MVC) architecture may be used to implement a user interface where the model carries out some application-useful task, the view(s) typically present aspects that are visible to the user and can display information obtained from the model, while the controller may be configured to update the model as per any user interaction/modification with the view(s). For example, regarding the block 40, the data elements can be pushed from the controllers into the view(s) via the model(s). The UI validations block 44 may involve user interface (UI) with Cascading Style Sheets 3 (CSS3) and jQuery™ JavaScript™ library UI elements via Bootstrap™ framework, for example.

The service layer 24, in an embodiment, may be configured to expose various services for maintaining the data sanity between the clients and the servers. FIG. 1 shows a plurality of services modules 46, 48, and 50.

The business layer 26 of the system 20 (Exit Legacy) may be implemented in software as a service (SaaS) model where the customers can subscribe to different tools based on their requirements. Customers can also determine size/volume of usage of these tools and duration required for access to these tools. The business layer 26 may include software as a service (SaaS) logic for utilizing various tools built with the experienced project execution and automation of the predictable work (see business layer 26 including a business components module 52 and a business validations module 54).

The integration layer 28 includes a web service client module 56, a message sender module 58, an asynch handler 60, and a file processor module 62. The integration layer 28 is coupled to a relational database management system (RDBMS) 64, as shown. In an embodiment, the integration layer 28 may be configured to allow the tools to run in an online/batch mode (web service client module 56) based on the time estimates (asynch handler 60) for the successful completion (file processor module 62). In regard to message sender module 58, users may be kept updated via email messages to ensure optimized time utilization for the end-user(s).

The data access layer 30 may include a hibernate entities module 66 and a Java™ Database Connectivity (JDBC) templates module 68. The data access layer 30 is also coupled to the relational database management system (RDBMS) 64, as shown. The layer 30 includes hibernated entities 66 may be used for optimized effort utilization of the user (i.e., developer) to allow them to focus on the core customer problems instead of the standard routine application problem. (Java™ Database Connectivity (JDBC) templates module 68).

The security layer (or component) 32 may include functionality to govern authentication and authorization. In this regard, in an embodiment, the security component 32 may be implemented using a Spring Security™ API—a framework configured to provide authentication and authorization to Java™ applications, which can be leveraged for interfacing with the Lightweight Directory Access Protocol ("LDAP") server(s) 70 and controlling the usage of the features that the exit legacy system 20 (e.g., when rendered as a portal) has to offer.

Figure 2:
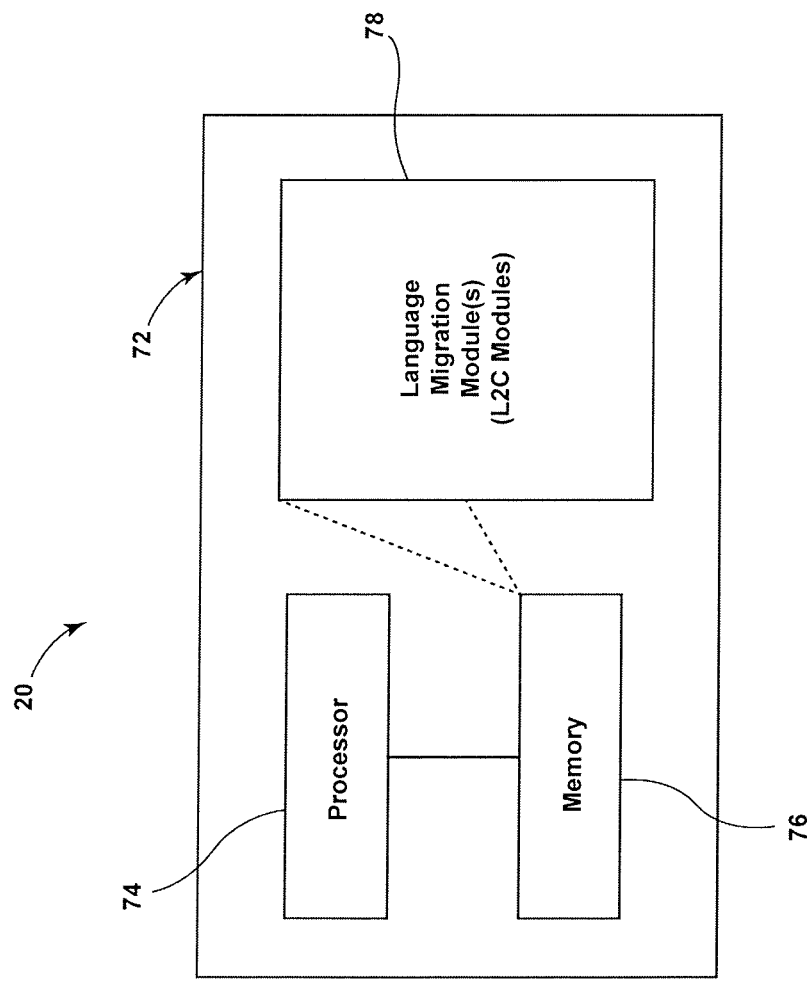
FIG. 2 is a simplified block diagram showing, in an embodiment, legacy to container (L2C) logic.

FIG. 2 is a simplified block diagram view showing the embodiment of FIG. 1 in a computer-implemented L2C system, designated system 72 (i.e., the computer-implemented system 72 corresponds to the L2C system 20 of FIG. 1). In the illustrated embodiment, the L2C system 72 may include one or more processors 74, a memory 76, a variety of input/output mechanisms (not shown) such as a display, a microphone, a speaker, and a network interface (wired or wireless), and one or more language migration module (or modules) 78 configured generally to facilitate the migration of legacy computer programs/applications (e.g., COBOL) to a microservices-based object oriented language (e.g., JAVA™, C #/.NET).

Processor 74 is configured generally to control the overall operation of system 72, including coordination and cooperation among and between other components thereof. In an embodiment, processor 74 is configured to execute a suitable operating system. Although not shown, the system 72 operates according to a supported operating system, for example only, Microsoft® Windows™ (e.g., 32-bit and/or 64-bit versions), variants of Linux®, Apple™ Mac OS X, and the like. Processor 74 may include a central processing unit (CPU), memory (in addition to or such as the illustrated memory 76) and an input/output (I/O) interface through which processor 74 may receive a plurality of input signals and to generate a plurality of output signals.

Memory 76 is provided for storage of data and instructions or code (i.e., software) for processor 74. Memory 76 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 76 may be internal to processor 74. The computer system 72 is configured, for example only through programming with a set of instructions, to perform any one or more of the functions, method, and/or tasks as described herein. The computer system 72 may be a personal computer, a notebook computer, a server, a tablet computer, a personal digital assistant ("PDA"), a smartphone, or any other computing machine or collection of computing machines capable of executing a set of instructions to perform as described for computer system 72 (and by reference system 20).

The language migration module(s) 78 may include application programs stored in memory 76 and configured for execution by one or more processors 74, to achieve an overall function of language migration, as described in greater herein. For example, the language migration module(s) 78 may be configured to implement the various layers/components of the system 20 as illustrated and described in connection with FIG. 1. The programs that define the language migration modules 78 may be referred to as a legacy-to-container logic which when executed by the processor 74 are configured for language migration as described herein.

It should be understood that for the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

Figure 3A:
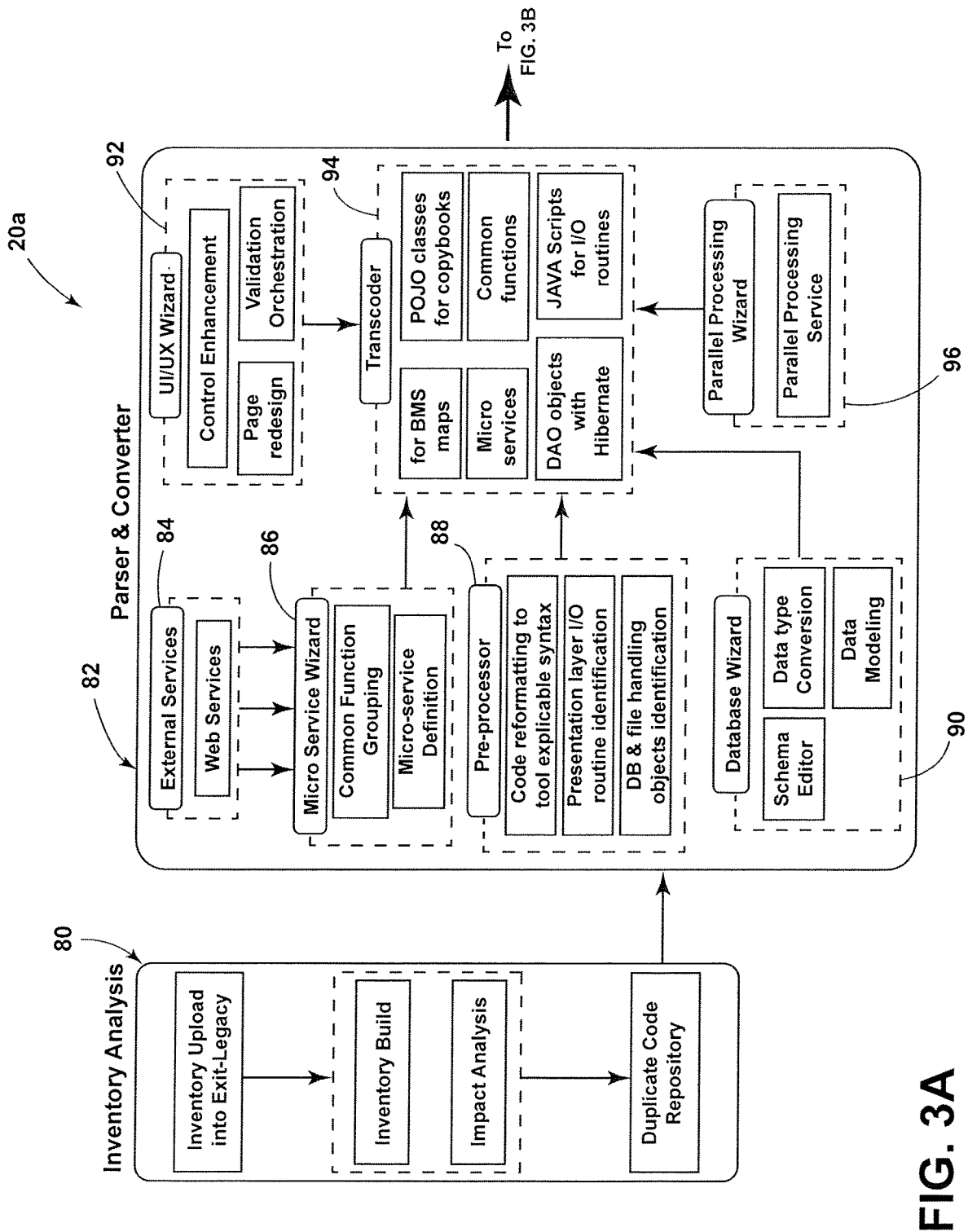
FIGS. 3A-3B are simplified block and process flow diagram showing, in greater detail and in an embodiment, the legacy to container logic of FIG. 2.
Figure 3B:
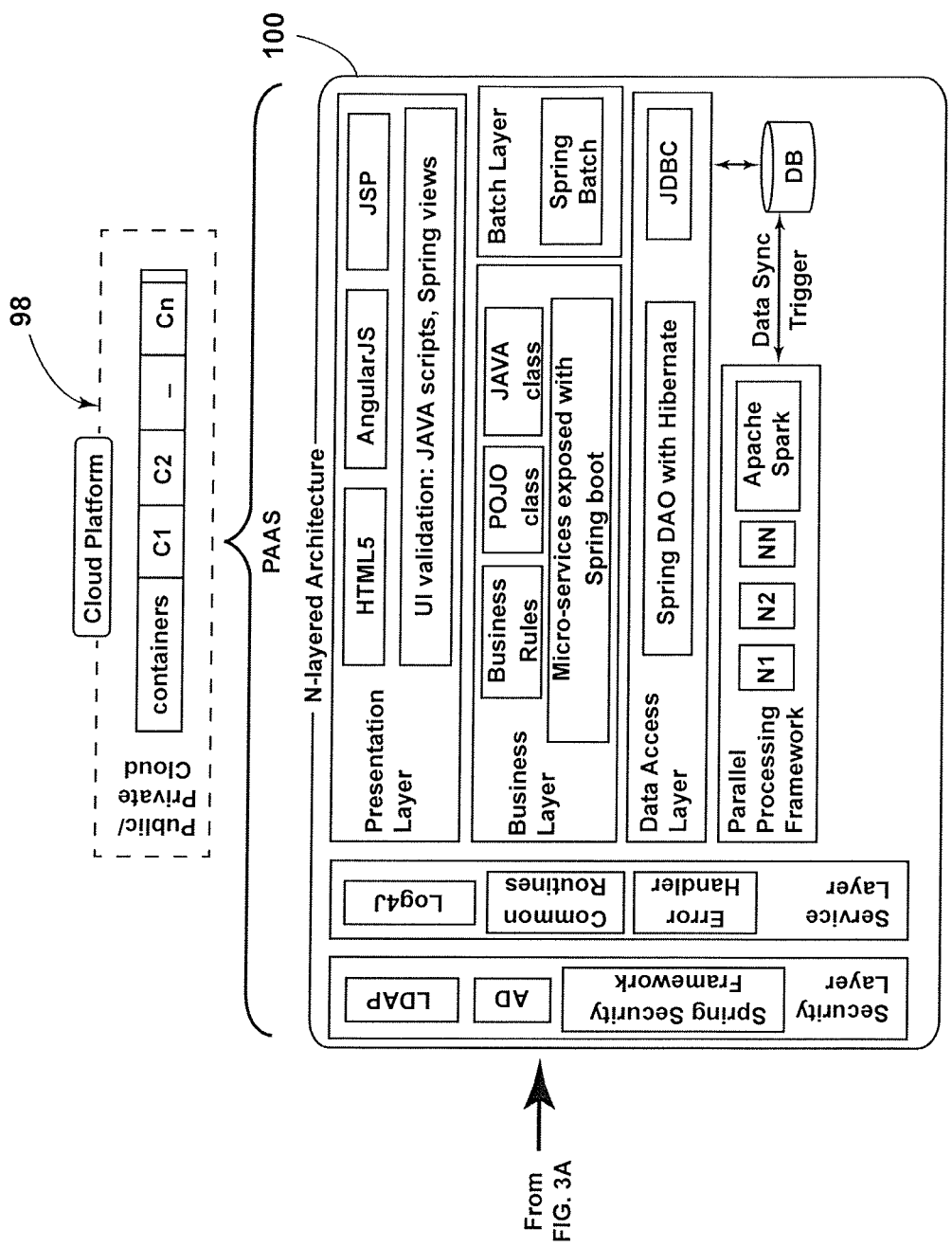

FIGS. 3A-3B shows the L2C system 20 in greater detail, in an embodiment designated 20a. The L2C system 20a includes an inventory analysis module 80, and a parser and converter module 82. The inventory analysis module 80 receives a legacy application from a user, for example only, such as by way of an upload from an enterprise user. The inventory analysis module 80 is configured to create (or build) an inventory of the legacy application(s) and generate an impact analysis of the migration of the legacy application(s). The inventory analysis module 80 also generates a duplicate code repository, as detailed herein, for use in a code de-duplication function. The inventory analysis module 80 may be configured to perform other functions such as parsing/scanning and generating certain metadata tables, as described below.

The parser and converter module 82 includes a plurality of functional blocks or modules, for example only, an external services module 84, a microservice wizard module 86, a pre-processing module 88, a database wizard module 90, a user interface/user experience (UI/UX) wizard module 92, a transcoder module 94, and a parallel processing wizard module 96.

The L2C system 20a is a wizard-based interactive tool, where the parser and converter 82 (e.g., in a base version thereof) converts one or more legacy languages (i.e., COBOL, NATURAL, PL1, CAGEN, ASSEMBLER, VB) to object-oriented Java™ and/or C #/.NET classes by slicing the monolithic procedural language programs into multiple-layered architecture. The module 82 as incorporated into the L2C system 20a includes various modules that are built to handle application code with carefully-tuned heuristic algorithms and which performs proper forensic analysis of the application inventory uploaded in the L2C system 20a.

In an embodiment, each paragraph/function/procedure in the legacy program will be bifurcated into multiple class objects. During forensic analysis, the legacy application program will be simulated to analyze the memory and understand the flow of the application program. This execution simulation helps to understand the program flow (e.g., for dynamically called programs—who is calling whom), the logical branch paths of the program, obsolete logical branch paths, obsolete/dead code, and unused variable(s) that may not be required to be migrated to the target platform.

In addition, the module 82 generates the program's skeletal framework that helps in connecting the dots by injecting the bifurcated classes into the main class by creating appropriate reference points. This ensures undisrupted program flow and functional equivalence. This also helps in creating microservices and in utilizing them to create an "Everything as a Service" (EaaS) target platform. The L2C system 20a ensures 100 percent code coverage during migration by extracting static candidate rules along with the logical branch path of the rules and dynamic business rule extraction (BRE) by execution simulation process. The external services module 84 is provided for rendering and facilitating external services.

The microservices wizard module 86 is configured to facilitate creation of services from the legacy source inventory and/or replace functionality being carried forward from the legacy application with enterprise-level microservices, which are assumed to already exist. While parsing the application(s) to be migrated, various levels of metadata information are generated and then stored in a database for future reference (i.e., a database associated with L2C system 20a—not the database being used by the legacy application that is being converted or the target platform). The database modeling wizard module 90 facilitates remodeling of the existing database model to support the new target platform architecture. The pre-processor module 88 readies the legacy source code for conversion. For example, the initial screen/form conversion from the legacy application will result in an HTML file; however, this HTML file will represent only basic form labels/input as per the legacy environment. In an embodiment, however, an interactive user interface (UI) editor wizard module 92 enables the user to make modifications to the initial screen conversion (white screen) so as to enrich the white screen with enhanced features such as new labels, controls, modifications to existing controls, etc. (e.g., to the HTML/Angular JS™ user interface). The L2C system 20a also includes a feature to identify long running processes and allow the user to specify which candidate process(es) in the converted code, via the parallel processing wizard module 96, should be moved to run on a parallel processing framework.

FIGS. 3A-3B also shows a cloud platform 98 and an N-layered architecture, designated collectively by reference numeral 100, that corresponds to the various layers shown in FIG. 1 but with specific blocks as implemented by the parser and converter module 82.

Language Migration Parsers.

Figure 4:
FIG. 4 are simplified plan views of the respective schema for a plurality of metadata tables used in an embodiment.

Language migration parsers are configured to handle application code with carefully tuned heuristic algorithms. When inventory (e.g., COBOL applications) is uploaded into the system 20a, for example via the application inventory module 80—FIGS. 3A-3B, the monolithic source code is bifurcated into different layers and metadata concerning the source code is created. The different levels of information are also parsed and stored in different metadata tables for further processing, as shown in FIG. 4. Initially, the parser scans through the entire application inventory and matches the pattern of the source code snippet to identify duplicate code portions. The information, for example the code snippet itself, the % match of the candidate rule, and the impacted programs, are stored in a deduplicate code table. A tree-based data dictionary is also created to store all of the variable declaration(s) along with their type, length, relation between the variables (e.g., how group variable and elementary items are related). This metadata extraction improves the efficiency of the language migration parser while creating getter, setter and POJO (plain old Java™ objects) classes for variable declaration. This will help to change the variable names into business equivalent names while migrating. Metadata tables also store the program-level information, such as statements, operations performed on the variable, input validations, database and database access related statements, business validations, along with all the logical branch paths and maintainability index of the applications.

The online screens (i.e., constituting the user interface (UI)) associated with the legacy application program will get converted into Angular JS™/HTML 5 files independently. The algorithm behind the parser intelligently captures all the user interface (UI) validation rules and creates equivalent client slide Javascript™ or replaces the same with validator controls. The UI screens are Spring Model-View-Controller ("MVC") compactable screens. Similarly, the database layers are separated out of the monolithic code and data access objects (DAO) objects are created. The connection between the DAO and BAL is established using Spring™ JDBC/Hibernate™ objects.

The following are the different steps that get executed during language migration: (1) convert basic mapping support (BMS) to Angular JS™/HTML5; (2) produce POJO/getter and setter classes from all the copybook variable(s) declaration(s); (3) identify and store duplicate code portions in a repository; (4) generate required metadata for the language migration; (5) microservice(s) generation; (6) optimize database (DB) schema mapping; and (7) identify long running processes as candidates and allow user selection to move to a parallel processing framework.

Detailed Example.

A detailed example of the operation of an embodiment of the L2C system 20a will now be set forth. As known, programs written in the COBOL programming language are arranged in a hierarchal structure wherein each element in the hierarchy may include one or more sub-elements that subordinate. For example, the hierarchy may include Divisions, Sections, Paragraphs (hereinafter paragraphs), Sentences, and Statements. In embodiments, the legacy program to be converted may be sliced or subdivided along paragraph boundaries, as described below.

Each COBOL program file has a specific operation or follows a specific business process. In an embodiment, an initial step involves a subject matter expert (SME) who may assist in renaming the COBOL files into an understandable format. For example, a COBOL file named HDBINP2S is a program which is used to provide pricing and rate information in an institutional application—accordingly, this COBOL file may be abbreviated by the user (SME) into InstPriceRateInfo. In an embodiment, the renamed files may be kept in camel case, as per Java programming language standards. Table 1 below lists several examples of the results of the file renaming, which table can be stored in an EXCEL™ file. The new package name(s) will be used later in the migration process (i.e., to create object-oriented packages(s)).

TABLE 1

COBOL File Renaming

| COBOL NAME | FILETYPE | New Package Name |
|---|---|---|
| HDBICALS | CBL | InstClaimCalcarePricing |
| HDBIINDS | CBL | IndemnityFeeSchedPricing |
| HDBIMCIM | CBL | InstClaimMedContrPricing |
| HDBINP2S | CBL | InstPriceRateInfo |
| HDBINSDM | CBL | InstHemodialysisContrPricing |

In the next step, each COBOL file in the legacy application is processed to identify all the COBOL paragraph(s), which are logically named and are unique for each file.

In an embodiment, the COBOL files are processed to extract all the paragraph(s) that are declared in the COBOL file(s). In an embodiment, the paragraph names may be identified by way of locating all the identifiers written between the 8th to 12th positions of the COBOL line(s). These identified paragraph names are then stored in the database for further reference, for example, in an EXCEL™ sheet. In this sheet, the same logic for renaming is maintained inasmuch as the COBOL paragraphs are renamed into an understandable format, for example, re-named in camel case. The re-naming process may also be done by the user (e.g., Subject Matter Experts ("SMEs"). Table 2 below shows the results of the paragraph(s) identification and renaming process. It should be appreciated that in this example, the InstPriceRateInfo package name now has associated therewith several COBOL paragraph declarations (e.g., 01100-INIT→Init, 01200-CONV-SVC-MENM→Convsvcmenm, etc.). The renamed Paragraph name should be unique for each COBOL file.

TABLE 2

Renamed COBOL Paragraph(s)

| Renamed COBOL File | COBOL Paragraph Name | Renamed |
|---|---|---|
| InstClaimMedContrPricing | 07200-EXIT | Exit |
| InstClaimMedContrPricing | 08300-CALL-INST-RULES-DB | Callinstrulesdb |
| InstPriceRateInfo | MAIN@HDBINP2S | InstPriceRateInfo |
| InstPriceRateInfo | 01100-INIT | Init |
| InstPriceRateInfo | 01200-CONV-SVC-MENM | Convsvcmenm |
| InstPriceRateInfo | 02000-GET-STD-ASC-RATES | Getstdascrates |
| InstPriceRateInfo | 02050-DETERMINE-CLAIM-TYPE | Determineclaimtype |
| InstPriceRateInfo | 02060-SEARCH-PLC-TBL | Searchplctbl |
| InstPriceRateInfo | 02070-SEARCH-TYPE-OF-BILL-TBL | Searchtypeofbilltbl |

Next, the program variables identified in the COBOL files are also given logical names. Table 3 below shows COBOL variables identified and/or extracted from a COBOL copybook associated along with its new Java™ variable name as well as other metadata, which may also be stored in an EXCEL™ sheet for further processing.

TABLE 3

COBOL variables logically renamed

| FILENAME | File Type | COBOL VARIABLE NAME | New Java name |
|---|---|---|---|
| HAAZIPCR | COPYBOOK | ZIPC-LOCALITY | zipcLocality |
| HAAZIPCR | COPYBOOK | ZIPC-RURAL-IND | zipcRuralInd |
| HAAZIPCR | COPYBOOK | ZIPC-STATE-ABR | zipcStateAbr |
| HAAZIPCR | COPYBOOK | ZIPC-PLUS4-IND | zipcPlus4Ind |
| HAAZIPCR | COPYBOOK | ZIPC-CBSA | zipcCbsa |
| HAAZIPCR | COPYBOOK | ZIPC-START-RANGE-CODE-4 | zipcStartRangeCode4 |
| HAAZIPCR | COPYBOOK | ZIPC-START-RANGE-CODE-4-NUM | zipcStartRangeCode4Num |
| HAAZIPCR | COPYBOOK | ZIPC-FILLER-END | zipcFillerEnd |
| HAAZIPCR | COPYBOOK | FILLER | filler |
| HACE2BLK | COPYBOOK | AEB1-ACE-EDIT-BLOCK1 | aeb1AceEditBlock1 |

The EXCEL™ spreadsheet(s) containing the above-identified metadata and logical names (i.e., Tables 1-3) may be uploaded along with the COBOL file(s) and copybook file(s) prior to execution of the L2C system 20a. In an embodiment, the system 20a may be configured to perform this function via the inventory analysis module 80 (Upload feature) in order to upload these files into the L2C system 20a.

Table 4 below shows the status after the logical file(s) containing renamed COBOL files, renamed paragraphs, and renamed variables, the COBOL file(s) themselves, and the copybook file(s) have been uploaded.

TABLE 4

Status after Uploading

| Name | Type |
|---|---|
| COBOL | File Folder |
| Copybook | File Folder |
| Logical_Excel_Sheet | File Folder |
| 1507976714560-Pgm | Compressed (Zipped) Folder |
| 1507976715253-Copybook | Compressed (Zipped) Folder |
| 1508144308332-Sprint4 | Compressed (Zipped) Folder |

Pre-Processing.

Figure 5:
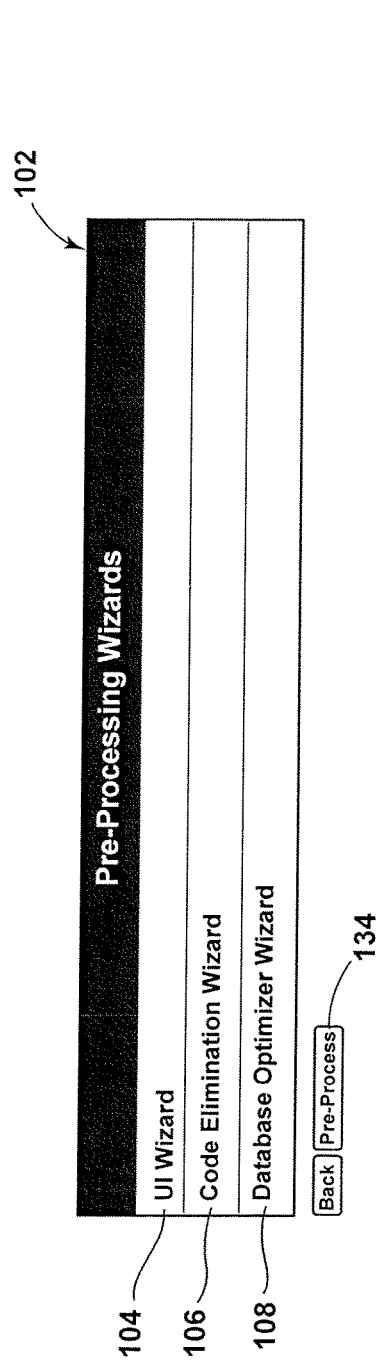
FIG. 5 is a simplified screen display showing pre-processor wizard options, in an embodiment.

After starting the execution of the L2C system 20a, the user is taken, as shown in FIG. 5, to the pre-processing wizard provided by the pre-processing wizard module 88 (best shown in FIGS. 3A-3B). In particular, FIG. 5 is a simplified screen display 102 generated by the pre-processing wizard module 88, which includes, in the illustrated embodiment, a user interface (UI) wizard 104, a code elimination wizard 106, and a database optimizer wizard 108.

The UI wizard module 92 (shown in FIGS. 3A-3B) is configured to provide the user-interactive UI wizard 104, which in turn is configured to automatically convert a legacy user interface, such as screen configuration(s) map(s) used in connection with mainframe platforms, into a modern form, such as into an HTML form. The UI wizard 104 is further configured to allow for user interaction and/or input in order to edit and/or augment the converted UI in order to enrich the user interface, as described in greater detail below.

As background and in this example, the legacy platform/application(s) to be migrated involves a mainframe system and associated application server(s) that may be configured to provide transaction management and/or connectivity to such mainframe(s) (e.g., IBM Customer Information Control System—CICS™). Such legacy systems may provide what is known as basic mapping support (BMS) which comprises an application programming interface between CICS™ programs and a terminal device, which is the display device that the end-user would see and/or interact with.

Further, in this example, the user interface (UI) of the mainframe may be identified by the file type. For example, the mainframe system may use the file type(s) *.BMS or *.MFS. These types of files are called maps. The UI wizard 104 is configured to provide a map parser which examines and analyzes the contents of the map file(s) and extracts all the metadata that is required for a map transcoder (also part of the UI wizard) to convert these BMS/MFS maps files into an HTML file. The metadata that is extracted includes without limitation the map name, the map set name, the field name, the label name, the field/label position, the field length, the field type and the field attribute. The map parser also extracts the function key labels.

In an embodiment, the map parser (i.e., a BMS parser hereinafter the BMSParser) scans through all the Map files and stores the results in a table named BMS_METADATA, the schema of which is shown below in Table 5 below:

TABLE 5

Schema for BMS_METADATA

| 1 | ID |
|---|---|
| 2 | FILENAME |
| 3 | MAPNAME |
| 4 | MAPSET |
| 5 | FIELDNAME |
| 6 | POS |
| 7 | LENGTH |
| 8 | ASKIP |
| 9 | PROT |
| 10 | UNPROT |
| 11 | NUM |
| 12 | REVISED_FIELD_NAME |
| 13 | METADATA_NAME |
| 14 | METADATA_VALUE |
| 15 | METADATA_CHAR_WIDTH |
| 16 | METADATA_MAX_CHAR |
| 17 | METADATA_TYPE |
| 18 | SYMBOLIC_MAP |
| 19 | COBOL_FILE_NAME |

This table stores all the possible property of the MAP file, which is further utilized to recreate an HTML file, as described herein.

There is another data table that corresponds to the MAP files, which table is named MAP_TABLE, the schema of which is set forth below in Table 6.

TABLE 6

| | Schema for MAP_TABLE |
|---|---|
| 1 | ID |
| 2 | TYPE |
| 3 | CLASSNAME |
| 4 | METHOD_NAME |
| 5 | FILENAME |
| 6 | MAP_NAME |
| 7 | MAPSET_NAME |
| 8 | SYMBOLIC_MAP_NAME |

The data stored in this table is extracted from the ONLINE COBOL programs otherwise known as the CICS™ COBOL programs. The data is extracted from the SEND and RECEIVE map commands in the COBOL file, as described herein.

The extracted metadata is then collated in and by the map transcoder in order to create an HTML file having the same fields and the size restrictions (definitions) on those text boxes as existed in the original map. The attributes are also transcoded as field styles. The function key labels are converted into menu items based on its feasibility/requirement.

Figure 6:
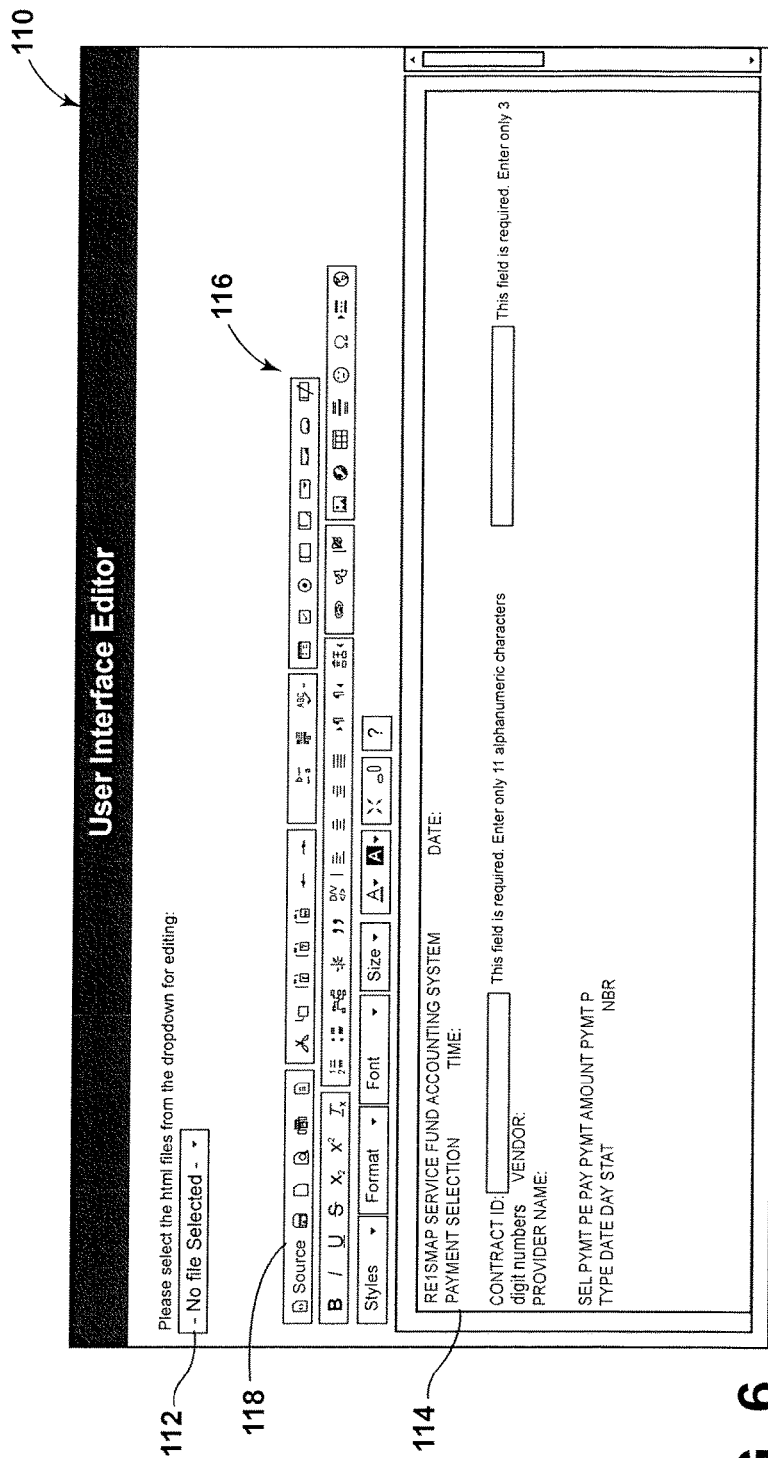
FIG. 6 is a simplified screen display showing, in greater detail and in an embodiment, the UI Wizard shown in block form in FIG. 5.

FIG. 6 is a simplified screen display 110 of a user interface editor, in an embodiment. The UI wizard module 92 is configured such that when the user selects ("clicks" on) the UI wizard (button) 104 in FIG. 5, the module 92 generates the "User Interface Editor" screen display 110. The UI editor screen display 110 includes a drop-down selection 112 that allows the user to select a transcoded HTML file (i.e., as generated by the above-mentioned map transcoder), which is then loaded into the UI editor—an online editor that allows the user to edit the various screen elements. As shown, the transcoded HTML is rendered and is displayed in pane 114 (e.g., sometimes called a white screen). The UI editor screen display 110 includes various tools 116 to enrich the screen display as available through HTML. For example, the user can add new labels, new controls, modify existing controls, and the like. In an embodiment, the target UI format may comprise HTML5/Angular JS™ (Javascript™). The user can save the edited (i.e., enriched) user interface by clicking the save button 118.

In addition, the UI editor includes drag and drop features to facilitate adding and/or modifying the HTML elements. The consolidation of one or more screen into a single screen is also possible. While consolidating the screens, the parser intelligently captures the screen-program mapping and stores this mapping in the database. The consolidation of program related to the screens happens automatically and appropriate output is generated. During screen consolidation, the wizard 104 helps to add new/modify the rules and the same gets incorporated into the program objects. The UI wizard 104 also has set of CSS file templates to enrich the screen. The predefined CSS template will have header, side tree menu and a footer. The user (e.g., customer enterprise IT) can define the CSS as per their standard and integrate the CSS using the wizard 104. The parser logic is built in such a way that whenever there is a change in the UI, the corresponding code changes will get reflected in all the associated components.

It should be understood that there are a plurality of techniques known in the art for a computer program to interact with user interface elements. One such technique is a so-called model-view-controller (MVC) approach. Briefly, the model is the program code that performs some task and the model provide a functional interface to allow the user to get information out of the model or to modify the information that is in the model. The view—for example the screen displays described above that are converted from the maps—provide a mechanism to display to the user the information that is stored in the model. The view allows user interaction or user manipulation/modification. The controller updates the model as needed when the user interacts with the view.

With this context, in an embodiment, the UI module 92 via the UI wizard 104 is configured to: (i) obtain the operational details of the function keys through extraction of such information from the (online) COBOL programs; and (ii) obtain values of the fields which are mapped from the symbolic map of the COBOL file. The symbolic map is like a copybook, which is converted in to Java™ POJO classes. These POJO classes are populated in the controller and gets mapped to the HTML files and the model in the case of SEND MAP command from the COBOL program. Where the UI module 92 encounters a RECEIVE MAP, the UI module 92 receives data from the form elements of the HTML file through the controller and is passed to the Java program for the business validation/process.

With reference to Table 7 below, the SEND MAP command in the COBOL file has a MAP name MLPEN00 and a MAPSET name MLPENCI. Each MAP can have more than one MAPSET. Each MAPSET is converted into a HTML file. The UI module 92 is configured to generate a controller file for every HTML file. Every controller file has a GET method to send data from the server side to the front-end. The metadata extracted from the line FROM (Z1-SYMBOLIC-MAP) is used to map data from the generated POJO for the variable Z1-SYMBOLIC-MAP. The POJO is mapped as a model element in the controller which gets mapped into the respective form fields.

TABLE 7

| Example COBOL code including SEND MAP |
|---|
| EXEC CICS SEND MAP ("MLPEN00") MAPSET ("MLPENCI") FROM (Z1-SYMBOLIC-MAP) CURSOR (Z1-CURSOR) ERASE |

With reference to Table 8 below, similarly, a RECEIVE MAP command in the COBOL file must be addressed as well. For a RECEIVE MAP situation, the conversion must be able to accept data from the front end HTML. Such data as controlled by the controller can be stored in the form of model data. The module 92 is configured to extract the form data into the symbolic map Z1-SYMBOLIC-MAP or as known as Java™ POJOs. These POJOs are used by the COBOL programs for further processing. The RECEIVE MAP code is mapped to a POST method of the controller.

TABLE 8

| Example COBOL code including RECEIVE MAP |
|---|
| EXEC CICS RECEIVE MAP ("MLPEN00") NOHANDLE MAPSET ("MLPENPA") INTO (Z1-SYMBOLIC-MAP) END-EXEC. |

Code Elimination Wizard.

The second wizard shown in the pre-processing display screen 102 of FIG. 5 is the code elimination wizard 106, which is configured to allow the user to eliminate line(s)

from the source code from further consideration/transcoding as per the user selection/designation.

Figure 7:
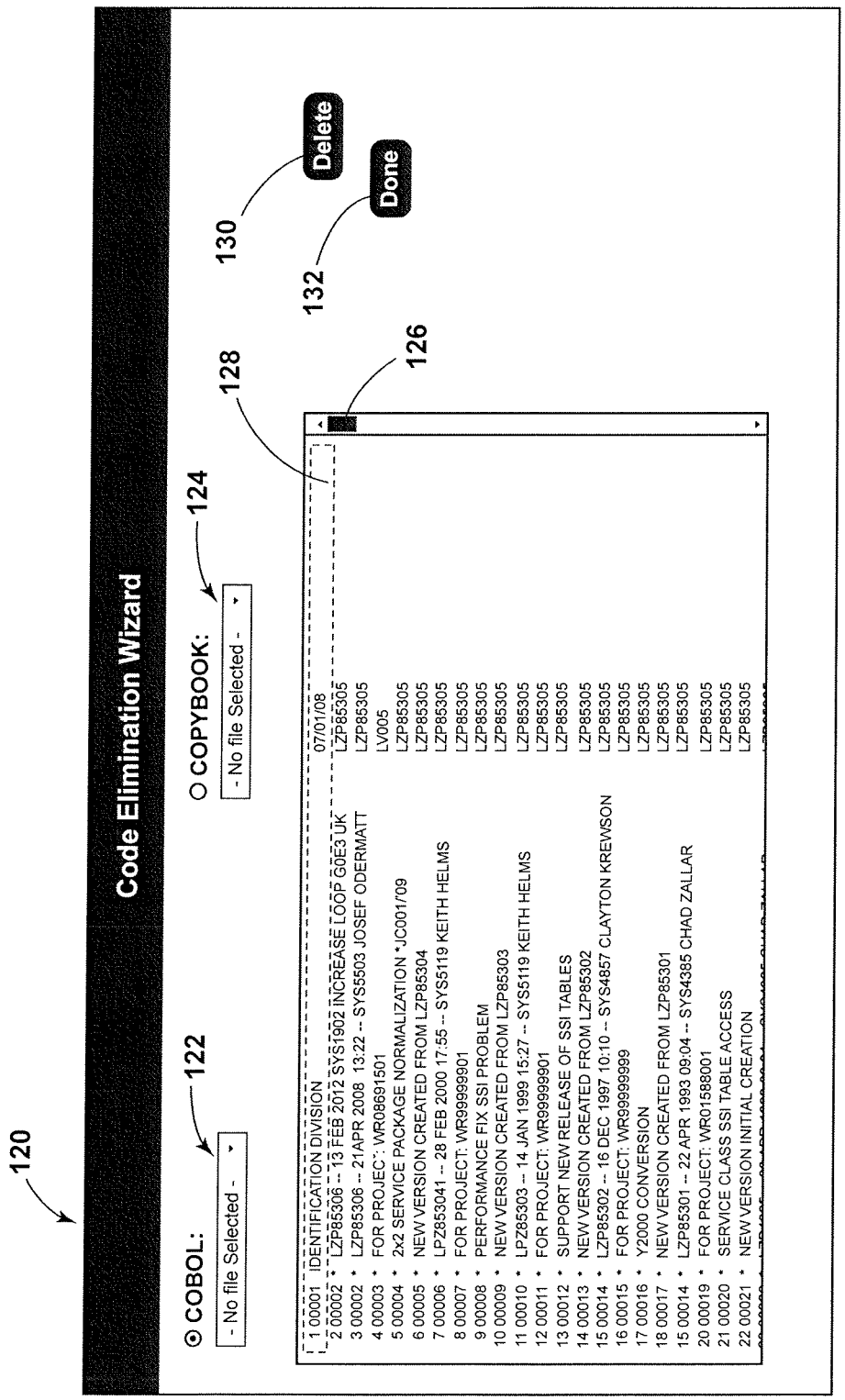
FIG. 7 is a simplified screen display showing, in greater detail and in an embodiment, the Code Elimination Wizard shown in block form in FIG. 5

FIG. 7 is a simplified screen display 120 that is provided for use in connection with the code elimination wizard 106. The wizard 106 is configured to provide a first mechanism 122, such as a drop down menu/selection, which allows the user to select a COBOL program file for review. Likewise, the wizard 106 is also configured to provide a second mechanism 124, such as a drop down menu/selection, which allows the user to select a COBOL copybook file for review. The wizard 106 still further allows the user to scroll, using scroll bar 126, to a desired line of code. The wizard 106 indicates to the user that a particular line of code is selected by virtue of the selection highlighting 128. The wizard 106 is further configured to receive from the user the instruction to delete the line of code when the user selects ("clicks") on the "Delete" button 130. Finally, the wizard 106 is configured to save the modified COBOL or COPYBOOK file when the user has completed the review and has selected ("click") the "Done" button 132.

During subsequent processing, in an embodiment, the lines of code designated for "deletion" will be ignored by the L2C system 20*a* during the conversion process. It should be understood that the decision to delete code is not an automated process. Rather, the decision to remove a particular block of code is a functional decision that needs the considered analysis and decision-making by the SME(s). That being said, a common scenario is identifying dead code and/or unused variables, which if deleted, could be avoided during the conversion process which would help in curbing the generation of unnecessary code. In an embodiment, the code elimination wizard 106 may be configured to add a comment character to the 7th position of the file to make the parsers and transcoders ignore those lines during metadata extraction and during code conversion.

Database Modeling Wizard.

The third wizard shown in the pre-processing display screen 102 in FIG. 5 is the database optimizer wizard 108. The database wizard module 90 (FIGS. 3A-3B) provides this wizard 108 which is configured to (i) allow the user to migrate the source COBOL files from IMS to DB2® and VSAM to DB2® queries (if any); (ii) migrate IMS and VSAM schemas; and (iii) migrate DB2® schema to Oracle® schema, if needed.

While parsing application source code using the metadata parser, all the database and data access related information are stored in the metadata table (e.g., FIG. 4—VSAM Key Table).

In the database optimizing wizard, the COBOL files are identified that have the mainframe-based database access. These files are only processed to extract the metadata that relates to the conversion of the database calls from IMS/VSAM to Oracle® compatible queries, for example. This data is saved in a table <projectName>_ADJACENCY_TABLE with the following schema, as seen below in Table 9.

TABLE 9

Schema for <projectName>_ADJACENCY_TABLE

| 1 | CATEGORY_ID |
| 2 | DBD-NAME |
| 3 | SEGMENT_NAME |
| 4 | PARENT_NAME |
| 5 | SEG-LEVEL |
| 6 | KEY_FIELD |
| 7 | KEY_FIELD_LENGTH |

TABLE 9-continued

Schema for <projectName>_ADJACENCY_TABLE

| 8 | KEY_FIELD_TYPE |
| 9 | FIELDS |
| 10 | LENGTH |

There is another table named <projectName>_SEGMENT_TABLE, with the schema defined below in Table 10. This table is extracted from the DBDs and the DCLGENs.

TABLE 10

Schema for <projectName>_SEGMENT_TABLE

| 1 | ID |
| 2 | DBD_NAME |
| 3 | SEGMENT_NAME |
| 4 | COL_NAME |
| 5 | COL_TYPE |
| 6 | COL_LENGTH |
| 7 | PRIMARY_KEY |
| 8 | ALLOW_NULL |
| 9 | DEFAULT_VALUE |
| 10 | CREATED |
| 11 | UPDATED |
| 12 | Use_default |
| 13 | updated_by |

The wizard 90 reads the database metadata table(s) to retrieve all the database schema related copybook information for the target schema data description language (DDL) generation (i.e., syntax defining the data structure or schema). The database wizard 108 is configured to facilitate mapping the source and target datatypes and other relevant constraints. The database wizard 108 supports any-to-any source and target database mapping. The inbuilt datatype mapping dictionary has all the permutation and combination of source and target database and datatype mapping. Once the target database model is finalized, the database wizard 108 displays the target field and its equivalent data types along with the constraints. The user can change/remove the existing constraints and/or create new constraints while optimizing the target schema. The parser handles array field types as well. The algorithm is set in the parser to convert the array field types into separate child tables. The parser will look into the copybook for the total number of array occurrences and decide whether to create the child table. When creating the child table, relevant referential integrity is also generated. The database wizard 108 is further configured to move the fields between parent and child tables, optimize the tables by switching fields across tables, allows to change the integrity and other constraints, and the like. Upon finalizing the changes, the database wizard 108 is configured to store all the information in the database modeling table for further processing. The data objects and relevant data access layer are also generated and injected into the migrated code. This process reduces the manual intervention after remodeling the database.

After the UI wizard 104, the code elimination wizard 106, and the database optimizer wizard 108 have been completed (or not opted), the user can select ("clicks") the "Pre_Process" button 134 in FIG. 5. The parser and converter module 82 then moves on to metadata extraction and pre-processing of the legacy source files. For clarity, note that the previous metadata extraction described above involved various file types, like MAP files and database files. The metadata extraction now involves COPYBOOK and COBOL files.

Pre-Processing.

This step involves the crucial part of data extraction, and is performed after the UI wizard 104, after selecting all the necessary source code changes that is required for this step i.e., the code elimination wizard 106 which eliminates code for conversion and after running the database optimizer wizard 108 where we use tools to convert the IMS and/or VSAM queries into COBOL or DB2® queries which are later converted into Oracle® queries. The pre-processor module 88 in FIGS. 3A-3B is configured to perform the pre-processing step as described in greater detail below.

The first step in the pre-processing is metadata extraction of the files (i.e., the copybook and the COBOL source code files). The data extracted is populated in multiple database tables. The data extracted from the COBOL files is an identification of all the copybooks used with either COPY and/or INCLUDE keyword(s) in both the DATA DIVISION and PROCEDURE DIVISION. All the copybooks addressed in the COBOL programs are listed in a table called Cobol_Copybook table (i.e., an excerpt of which is shown in FIG. 4).

The copybooks that are included inside the DATA DIVISION are files having variable declaration. These are non-executable copybooks or copybooks having no executable code. The copybooks are then identified in regard as to whether they start with the root level (i.e., the 01 level). These files are identified or otherwise designated as not to be expanded in the COBOL source. The rest of the copybooks are expanded under its parent variable in the COBOL file.

There are copybooks that are included inside the PROCEDURE DIVISION. These are executable copybook(s). These copybooks contents are simply expanded starting from the position where that particular file is expanded.

The second step of pre-processing is extracting, in an embodiment, all possible details about each identified variable. Table 11 shown below is an example schema of the Cobol_variable_details table.

After extracting all such data, the identified variables are transcoded into the Java™ object classes (i.e., the "Plain Old Java™ Object—POJOs). The converted *.Java files are then placed inside the copybook package.

The third step is formatting the COBOL code to make it suitable for conversion. For example, COBOL instructions may be written in multiple lines. The pre-processing module 88 is configured to process such multi-line instructions to make them a single-line instructions first.

After these changes have been made, the next step involves dividing the COBOL program into individual paragraph files, and by this, it is meant to take each individual COBOL file and then to slice or otherwise sub-divide the COBOL source code in respect of paragraph boundaries. Table 12 below shown example subdivided paragraphs.

TABLE 12

Paragraph Table

| Name | Type |
|---|---|
| CntrctRulsDbIO@CallDateCheck.cobol | COBOL File |
| CntrctRulsDbIO@CallWgmdateRtn.cobol | COBOL File |
| CntrctRulsDbIO@CheckSendData.cobol | COBOL File |
| CntrctRulsDbIO@ChkActContrRule.cobol | COBOL File |
| CntrctRulsDbiO@CompareOldNewValue . . . | COBOL File |
| CntrctRulsDbiO@CompareOldNewValue . . . | COBOL File |
| CntrctRulsDbiO@DeltUnqRule.cobol | COBOL File |
| CntrctRulsDbiO@EvaluateSqlcode.cobol | COBOL File |
| CntrctRulsDbiO@ExitCheckSendData.cob . . . | COBOL File |
| CntrctRulsDbiO@ExitChkActContrRule.c . . . | COBOL File |
| CntrctRulsDbiO@ExitCntrctRulsDbIO.cobol | COBOL File |
| CntrctRulsDbiO@ExitCompareOldNewVa . . . | COBOL File |
| CntrctRulsDbiO@ExitCompareOldNewVa . . . | COBOL File |
| CntrctRulsDbiO@ExitDeltUnqRule.cobol | COBOL File |
| CntrctRulsDbiO@ExitEvaluateSqlcode.co . . . | COBOL File |
| CntrctRulsDbiO@ExitFetchAllRules.cobol | COBOL File |
| CntrctRulsDbiO@ExitGetAllruleHistr.cobol | COBOL File |
| CntrctRulsDbiO@ExitGetAllRules.cobol | COBOL File |
| CntrctRulsDbiO@ExitGetEffectiveRules.c . . . | COBOL File |
| CntrctRulsDbiO@ExitGetRuleHistory.cobol | COBOL File |
| CntrctRulsDbiO@ExitGetRulesForCtrc.co . . . | COBOL File |
| CntrctRulsDbiO@ExitGetUniqueRule.cobol | COBOL File |

TABLE 11

Variable details

| No. | Name | Datatype | Comment |
|---|---|---|---|
| 1 | ID | INT | |
| 2 | FILE_NAME | VARCHAR | The file name to which the variable belongs |
| 3 | VARIABLE_NAME | VARCHAR | The variable name |
| 4 | VARIABLE_TYPE | VARCHAR | The datatype in the COBOL file |
| 5 | VARIABLE_VALUE | TEXT | The VALUE initialized while declaration |
| 6 | JAVA_DATA_TYPE | VARCHAR | The equivalent datatype in java |
| 7 | PARENT | VARCHAR | Whether group or a parent variable Y/N |
| 8 | LEVEL | INT | Level of variable in COBOL while declaration |
| 9 | JAVA_EQUIVALENT | VARCHAR | The variable name in java format |
| 10 | SECTION | VARCHAR | The section the variable belongs to |
| 11 | CLASSNAME | VARCHAR | The Pojo class name the variable belongs to |
| 12 | ROOT_LEVEL | INT | The root level of the group |
| 13 | NAMEFLAG | VARCHAR | Flag to identify the naming structure |
| 14 | LENGTH | INT | The length of the COBOL variable |
| 15 | EXPAND | VARCHAR | Whether the file is expanded or not |
| 16 | REDEFINE | VARCHAR | Field is populated if it is a REDEFINE type |
| 17 | BOOLEAN_GROUP | TINYINT | Whether a Boolean group variable |
| 18 | TREE_STRUCTURE | VARCHAR | Parent.child hierarchy |
| 19 | CHILD_COPYBOOK | VARCHAR | If copybook expanded |
| 20 | CHILD_COPYBOOK2 | VARCHAR | |
| 21 | VAR_TRANSCODED | TEXT | Transcoded variable |
| 22 | DECIMAL_LENGTH | INT | The length of the decimal unit |
| 23 | OCCURS_TIMES | INT | If variable is array type |
| 24 | RETRO_FLAG | VARCHAR | If variable is being used for retrofit |

In particular, each paragraph is identified by the token declaration starting in between the 8$^{th}$ to the 12$^{th}$ position in the line, as known. These now-sub-divided or sliced paragraphs of COBOL code are stored into individual *.cbl files. In an embodiment, the naming pattern may be in the format: <Logical Filename>@<logical Paraname>.cbl.

While doing this slicing operation, the pre-processor module 88 is further configured to—at the same time—insert each line into a Cobol_Deduplication table with file name (see above), the paragraph name, and the original line (see FIG. 4 for an excerpt of this table).

The next column populated in this table is Populated_line. For populating this column, the original COBOL instruction is taken and is identified whether it contains any other variable/value other than the keywords. The line containing any variable is replaced by the datatype and the size of the variable during declaration. Matching logic is executed on this table and every Processed_line of one paragraph is compared to every other Processed_line of other paragraphs but itself. If it matches, then the identification column is populated (see FIG. 4 for a COBOL Deduplication Match Table). Based on this work, the deduplication wizard is populated.

The paragraphs of the COBOL files are extracted into a temp folder—further facilitating the paragraph-to-class conversion. After the pre-processing step by pre-processing module 88, the file structure in the back end looks like that set forth below in Table 13, and the processing proceeds to a re-architecting step.

TABLE 13

File Structure after Pre-processing

| Name | Type |
| --- | --- |
| COBOL | File folder |
| COBOL PREPROCESSOR | File folder |
| Copybook | File folder |
| Logical_Excel_Sheet | File folder |
| temp | File folder |

Figure 8:
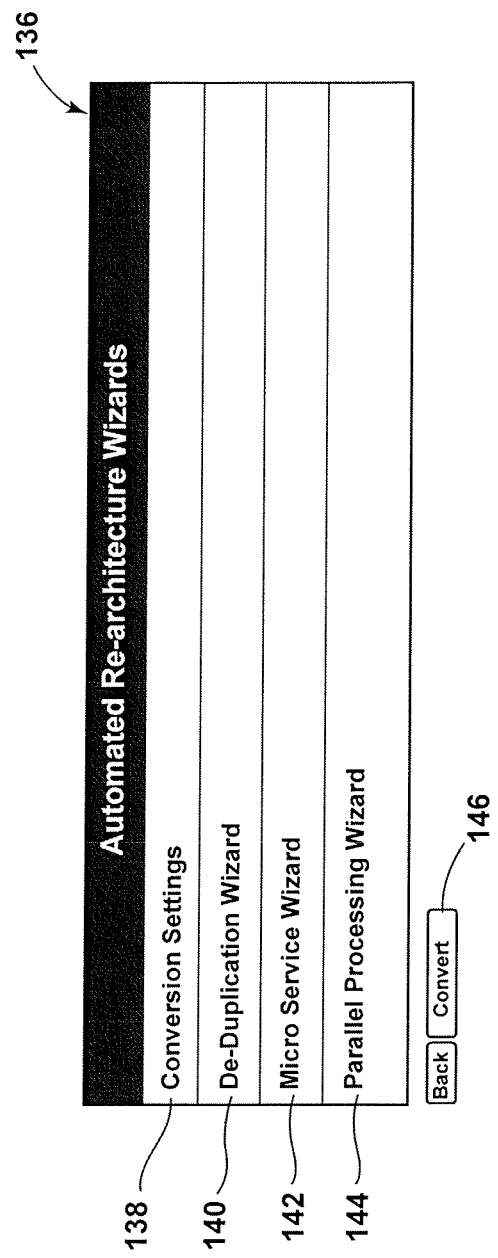
FIG. 8 is a simplified screen display showing automated re-architecture wizard options, in greater detail and in an embodiment.

FIG. 8 is a simplified screen display 136 showing a plurality of additional features (wizards) that may be selected by the user in respect of re-architecting the legacy source code. Screen display 136 shows a conversion settings option 138, a de-duplication wizard 140, a microservices wizard 142, and a parallel-processing wizard 144. It should be understood that additional wizards may be included in the automated re-architecture wizard page.

Conversion Settings.

The L2C system 20a includes this option 138 in order to allow the user, among other things, to select what paragraphs will need to be converted into methods wherein the remainder (unselected here) will then be converted into classes.

De-Duplication Wizard.

An initial process performed by the L2C system 20a is the identification of the duplicate code snippets from the entire application (source code) inventory and then to store such identifications in the de-duplicate table. In an embodiment, the duplicate code may be identified by performing different permutation and combination of code patterns that matches the source code inventory.

Figure 9:
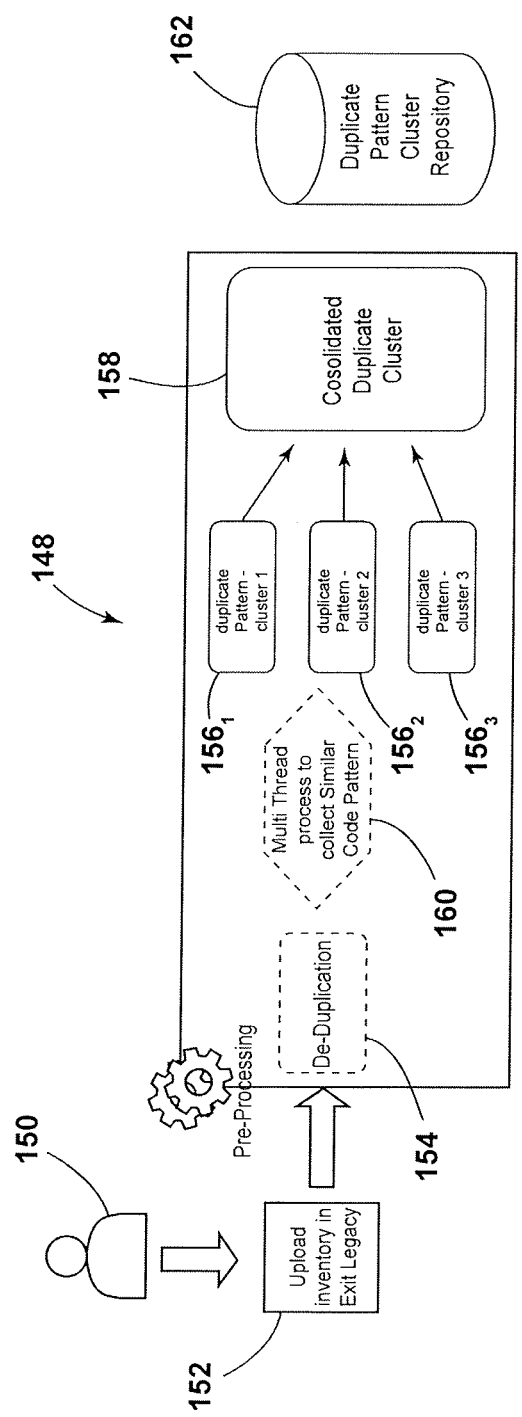
FIGS. 9-10 are simplified block and process flow diagram views showing, in an embodiment, aspects of the code de-duplication wizard shown in block form in FIG. 8.

FIG. 9 is a simplified flow and block diagram showing the process (designated by reference numeral 148) of code de-duplication in accordance with an embodiment. Initially, a user (e.g., designated user 150) uploads at 152 legacy source code inventory into the L2C system 20a. This step was described above in connection with FIGS. 3A-3B. Next, the language migration parser performs the de-duplication data pre-processing, designated at 154.

Generally, the deduplication parser is configured to compare two program objects and then identify the accurate characterization of the structural similarity of the code pattern and generate abstract syntax trees. While metadata extraction, the COBOL line is processed to be converted into one line of instruction. After this processing the line of code is checked for the presence of variable. The variable is then mapped in the COBOL_VARIABLE_DETAILS table (FIG. 4) with the COBOL file name. The system extracts the datatype and size of the variable from the database and while saving this instruction in a COBOL_DEDUPLICATION table, the schema of which is shown in Table 14 (and FIG. 4—partial). The variable is replaced by the type and size. The system also truncates the spaces in the line. The changed line is stored in the PROCESSED_LINE column of the COBOL_DEDUPLICATION table (Table 14). The schema for the COBOL_DEDUPLICATION table is shown below in Table 14.

TABLE 14

Schema for the COBOL_DEDUPLICATION table

| | |
| --- | --- |
| 1 | ID |
| 2 | FILE_NAME |
| 3 | METHOD_NAME |
| 4 | ORIG_LINE |
| 5 | PROCESSED_LINE |
| 6 | IDENTIFICATION |
| 7 | TRANSFER_LABEL |
| 8 | USER_SELECTION |
| 9 | MICROSERVICE_IDENTIFI . . . |
| 10 | RETRO_FLAG |

There is another Java™ process that extracts data from the COBOL_DEDUPLICATION table 14 paragraph-wise and then compares it with the rest of the paragraphs recorded in the table. The code block is considered as a duplicate paragraph only when it matches with the other paragraph with 90% accuracy in the table, for example only in a non-limiting embodiment. The code block is considered as a duplicate paragraph only when it matches with the other para with 90% accuracy. This is performed as an iterative process in order to group the equivalence structure to form a cluster. Multiple clusters are created, such as shown as 156$_1$, 156$_2$, . . . , 156$_n$, where n=3. These clusters are consolidated at 158. Furthermore, in an embodiment, this process may be performed as a multi-threaded action, designated at 160. The multiple clusters 156$_1$, 156$_2$, . . . , 156$_n$ are compared in order to create a repository 162 of unique clusters by replacing/eliminating the duplicates. The above-described process gets executed for each program and then drills down into procedure level and then further down at each word level for comparison purposes. This analysis helps to identify the duplicate code accurately.

Figure 10:
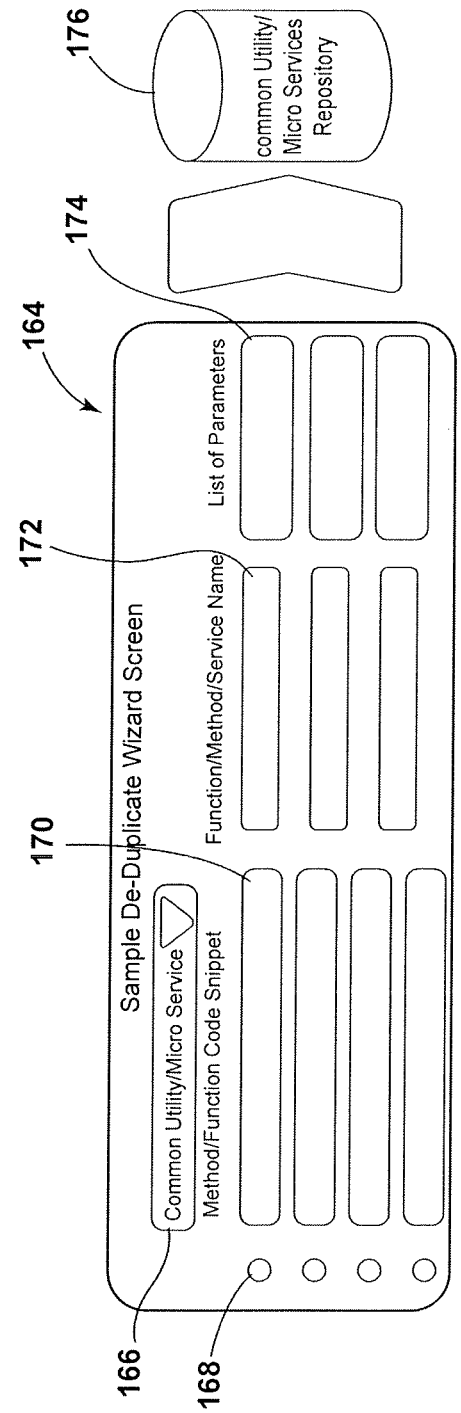

FIG. 10 is a simplified screen display 164 showing the de-duplication wizard 140 of FIG. 8 in greater detail. Once the duplicate code snippets have been identified and stored in the table (COBOL_DEDUPLICATION), the de-duplication wizard 140, with a user-interactive UI where the user can select "Common Utility/Micro Service" from the drop down menu 166, allows the user to categorize which part of the code needs to be part of a Java common utility class(es). In particular, in an embodiment, both the paragraphs are stored line by line into a table named COBOL_DEDUPLI- CATION_MATCH Table, the schema for which is reproduced below in Table 15 (FIG. 4—partial view).

TABLE 15

Schema for COBOL_DEDUPLICATION_MATCH Table

| | |
|---|---|
| 1 | ID |
| 2 | FIRST_FILE_NAME |
| 3 | FIRST_METHOD_NAME |
| 4 | FIRST_ORIG_LINE |
| 5 | SECOND_FILE_NAME |
| 6 | SECOND_METHOD_NAME |
| 7 | SECOND_ORIG_LINE |
| 8 | MATCHED |
| 9 | COUNT |
| 10 | FIRST_ORIG_LINE_DOUBLE |
| 11 | SECOND_ORIG_LINE_DO . . . |

The COBOL_DEDUPLICATION_MATCH table has two columns FIRST_ORIG_LINE which stores the instruction line of the first paragraph that is getting compared to the rest of the paragraphs of the inventory and SECOND_ORIG_LINE which contains the instruction line of the paragraph which is not the same as the paragraph name in FIRST_METHOD_NAME. If the line is a 100% match, then the column MATCHED is populated as a 'YES' else 'NO' is populated. The Deduplication wizard is populated with a paragraph name only when, for that paragraph the number of 'YES's is greater than 90% of its total number of instruction lines of FIRST_METHOD_NAME.

In an embodiment, more than one common utility class may be created based on a user preference. In an embodiment, the functions/methods which have structural and syntactical match up to about 70% (in sequential top-down order) in an embodiment will be inherited and extended. For a match, the system has concentrated on the functionality of a paragraph of the COBOL file. Like the original MOVE instruction mentioned below Table 16 as an example:

TABLE 16

COBOL code example

MOVE '01000' TO WS-ABEND-PARA is
converted into MOVE'01000'TOPIC X(06).

The variable WS-ABEND-PARA is replaced with X(06). The spaces are also removed to avoid mismatch. Another paragraph might have an instruction with the same datatype and size but a different variable name. To prevent that mismatch, the system replaces the variable name with the variable datatype. An instruction line might have multiple spaces in between which might prevent the matching.

These paragraphs are created as common classes which are placed in the common package and the Paragraph call is translated into common class call. If the user has selected a paragraph as being a duplicate paragraph, all the paragraphs that are matching with the Paragraph are not converted into a Java™ class. Instead, an identification is saved in the COBOL_DEDUPLICATION_TABLE to identify that the paragraph is a duplicate paragraph and which class to refer to in place of that. The system can have a user defined common class name.

The above-mentioned inheritance/extended approach minimizes the target code base and will generate more maintainable object oriented source code. When the user declines to follow the de-duplicate wizard from FIG. 8 (i.e., it is skipped), then one common utility class for each cluster will be generated and then injected into the program skeletal framework.

In particular, a radio button 168 is the option provided to the user to view the code lines of the Para/Method name mentioned in the Method/Function code snippet (in box 170). The system can allow user to select a microservice name (i.e., destined for box 172) to the paragraph name from the list of microservices list provided by the user from the drop down named Common Utility/Microservice (drop down box 166). This list is taken as an input from the user while inventory upload. The system is configured to either (i) map any of the provided microservice name or (ii) any user specific name and create the common module into a webservice (microservice—as set forth in box 172) and instead of a class call, that particular paragraph will be called as a service from the application. In the parameter block 174, the system holds all the variables/parameters that will have to be mapped in the service.

With continued reference to FIG. 10, the wizard 140 displays the duplicate code snippets (e.g., in an embodiment, all the snippets in a paragraph) in the selected inventory along with its match percentage. The wizard 140 is configured so as to allow the user to go forward and select all paragraphs that need to be created as common classes. In particular, the wizard 140 is configured to compare the lines of code of that program on a per-paragraph basis with every other paragraph recorded in the metadata table mentioned above. In an embodiment, the tolerance level may be set to 90%. In a further embodiment, the wizard 140 may be still further configured to generalize the comparable lines one step further by removing the variable names in the line of code with its variable type and its size. For example, assume a comparison between two statements—two COMPUTE statements and two variables each. These variables might have different name(s), but what makes them a match is if the variables are of same datatype and have the same length in its declaration in the COBOL file.

Microservices Wizard.

The next step is the creation of microservices using microservices wizard 142 using the common utility class objects that were generated using the de-duplicate wizard 140. This is shown in FIG. 11.

Figure 11:
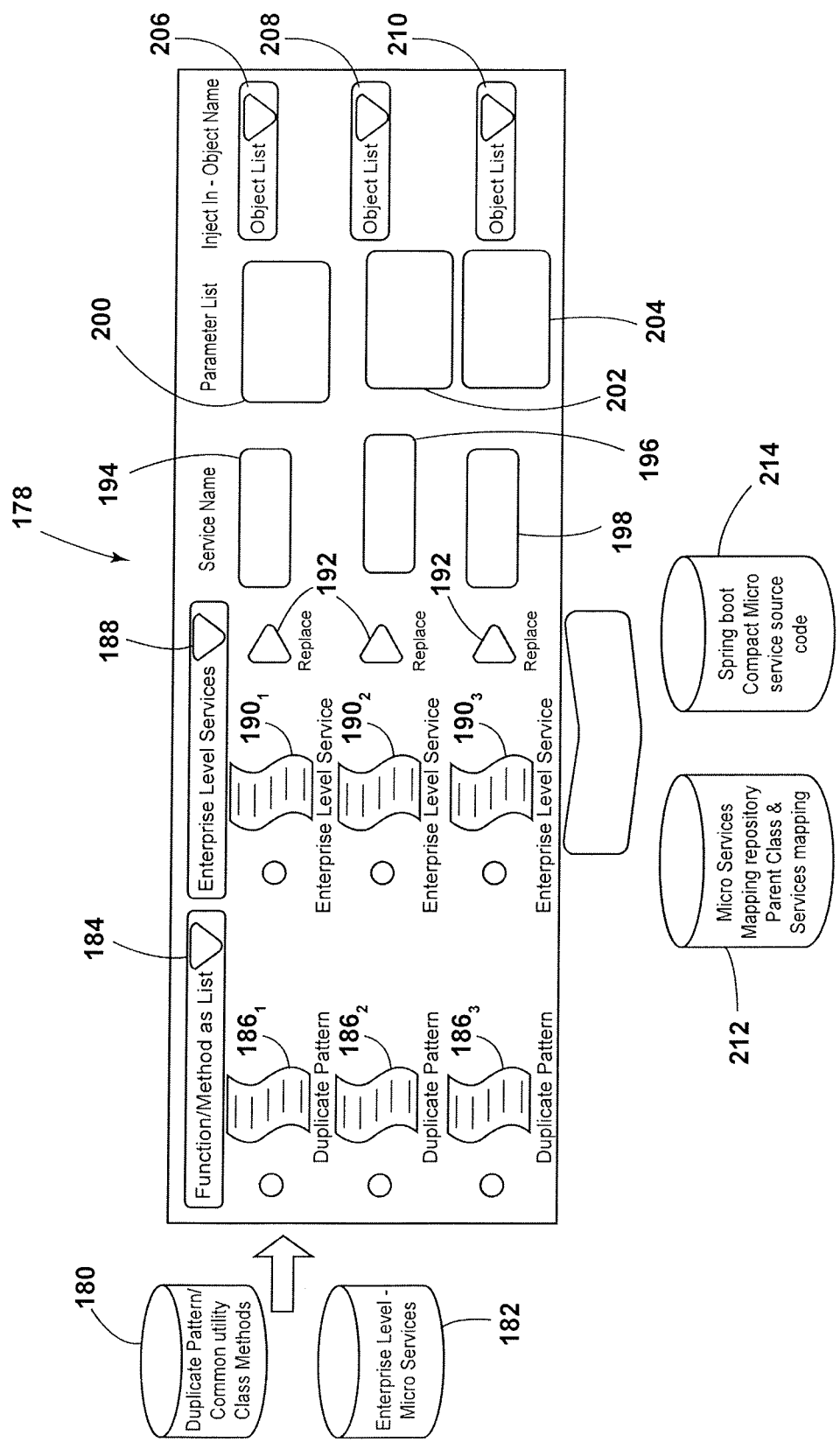
FIG. 11 is a simplified block and process flow diagram view showing, in an embodiment, aspects of the microservices wizard shown in block form in FIG. 8.

FIG. 11 is a simplified microservices creation process diagram, in an embodiment. Once execution of the de-duplication wizard 140 has been completed, various functions/methods will have been categorized under different common utility classes, as shown as being stored in the storage 180 in FIG. 11, and which common utility classes are also listed in the microservices wizard 142. The objective of the microservices wizard 142 is to create "everything as a service" (EaaS). FIG. 11 also shows that various enterprise-level services from the storage 182 are also provided to the microservices wizard 142.

The individual process that is created as a microservice will be configured to be executed by itself without any dependencies and/or without having to be trigged by parent/root object(s). In the microservice wizard 142, the list of function/method(s) as per drop-down menu 184 are shown as exemplary items $186_1$, $186_2$, . . . $186_3$. Likewise, in the microservice wizard 142, the list of enterprise-level services as per drop-down menu 188 are shown in exemplary as exemplary items $190_1$, $190_2$, . . . $190_3$, and can, in an embodiment, replace the corresponding function/method in the common utility classes. The microservices wizard 142, as shown in screen display 178, may be further configured to allow user naming as per boxes 194, 196, and 198. All the enterprise-level services and required parameters (see respective parameter lists 200, 202, and 204) to invoke the respective services are stored in the microservices table. The enterprise-level service name, the function/method to be replaced and the required set of parameters to invoke the services are stored in microservices metadata table. While converting the legacy program, the identified/selected microservices will be directly injected into the boot system using Spring™ boot framework (item 214) to invoke the service as independent process without invoking the parent function. During the program conversion (see below), the code snippets are replaced with appropriate microservice calls along with required input parameters. The object name in which the microservice calls are injected may be established via UI selection (drop-down menus 206, 208, 210). All the microservices-versus-calling object mappings are stored in the tables for future references (see item 212).

Additionally, in an embodiment, the microservices wizard 142 can be configured to display to the user the paragraphs and common paragraphs and give an option to the user to select which will need to be converted to or as a microservice and which paragraph(s) can be replaced with an existing microservice which will need to be uploaded by the user. As already described, the code snippet/paragraph can be converted into a microservice or can be replaced by previously existing microservice.

Parallel Processing Wizard.

The parallel processing wizard 144 in FIG. 8, when invoked, lists the long-running processes and then moves them into a parallel-processing framework. The recognition that a process is long-running may be achieved, in an embodiment, by analyzing the execution job logs and by simulating the application execution and storing the relevant information, such as process/program name, start time and end time of the process, the type of process (i.e., whether it is a complete batch process or an online calling batch process or an online process). When the identified process is a batch process, other relevant information, such as successor and predecessors process(es) are identified and stored. The objective is to move all the identified process(es) into a parallel-processing framework. In an embodiment, if the project needs to implement parallel processing, then the user needs to provide (identify) the classes that should be altered during conversion to make it compatible to parallel processing environment.

Once the process(es) are identified, the relevant Spark™ methods required to invoke the process(es) are injected into the generated code. Based on the enterprise choice, for example, what type of persistence layer, data extraction and load scripts are generated to fetch the data from the RDBMS into HDFS using Sgoop™. Similarly, the parallel processing wizard 144 lists the microservices that are created and helps to consume the services that are exposed. The parser's intelligent algorithm keeps track of all the information and stores them for further processing by the L2C system 20a. If the parallel processing wizard 144 is skipped (or nothing is selected from the wizard), then the subject process(es) will be implemented as a normal Java™ process.

With continued reference to FIG. 8, once the wizards 140, 142, and 144 have been either completed or skipped, then the user will click on the convert button to start the conversion process.

Legacy Code Conversion.

According to the instant teachings, the conversion of the legacy COBOL source code is done in a synchronized manner Until now, we have divided the Data Division and the Procedure Division. By synchronized manner, it should be understood that the conversion process concentrates upon variable(s) extraction and conversion. The DATA DIVISION is the variable layout of the COBOL file. So we first aim for its metadata extraction and conversion. The second process is concentrating on the PROCEDURE DIVISION which contains the business logic of the file that is being converted. The DATA DIVISION is further divided into WORKING STORAGE SECTION and LINKAGE SECTION. PROCEDURE DIVISION is divided into Paragraphs. The above is a synchronized process as the metadata as well as the conversion process is interdependent.

As known generally, the Data Division is divided into Working Storage Section and Linkage Section. All the data in the Data Division is converted into Java™ POJOS. The COBOL copybooks are also converted into POJOS.

TABLE 17

| COBOL Code Snippet |
| --- |
| 01 HDBINSTS-PARM-LIST.<br>    05 HDBINSTS-KEY-FIELDS.<br>        10 HDBINSTS-SEND-NST    PIC X(06).<br>        10 HDBINSTS-SEND-NST-KEY-DTE<br>            PIC S9(09).<br>        10 HDBINSTS-SEND-IRF    PIC X(05). |

Table 17 shows an example COBOL code snippet for conversion. The number preceded by the variable name HDBINSTS-KEY-FIELDS is understood as the level by the parser and converter 82. This recognition of level determines the position of where the specific POJO will be declared in the converted code.

When a variable starts with 01 level, that is the base variable or the base parent. If there is a variable declared just below the 01 (HDBINSTS-PARM-LIST) level having a level value greater than 01, then that variable (HDBINSTS-KEY-FIELDS) is considered as the child of the 01 (HDBINSTS-PARM-LIST) variable. It might also happen that the 01 level variable does not have any child variable, which in such case, it is considered as an individual variable.

The wording PIC X(06) depicts the datatype and the size of the variable. Although Java™ does not provide control over the length of each variable, this data is saved in our metadata and may be used when a value is set into the variable (i.e., the program may substring the value to the required size of the var as declared in COBOL). This leads to properly maintaining the logical flow of the COBOL program where comparisons are based on those variables. For example, consider the COBOL statement reproduced in Table 18 below.

TABLE 18

| COBOL Code Snippet |
| --- |
| MOVE HDBINSTS-SEND-NST TO HDBINSTS-SEND-IRF. | where HDBINSTS-SEND-NST has the value of IRF020.

The transcoded line then looks like the code snippet in Table 19 below:

TABLE 19

| Transcoded COBOL |
| --- |
| HdbinstsParmList.setHdbinstsSendIrf(StringUtils.<br>rightPad(HdbinstsParmList.get<br>HdbinstsSendNst( ),6).substring(0,5)); |

The StringUtils.rightPad( ) appends the required number of spaces again as per the size of the variable.

With continued reference to the Table 17 and the code snippet set forth therein, the statement HDBINSTS-PARM-LIST is converted into a POJO class as it is a parent relationship, as reproduced below in Table 13.

TABLE 20

Transcoded COBOL Into Java

```
class HdbinstsParmList
{
     HdbinstsKeyFields hdbinstsKeyFields = new HdbinstsKeyFields( );
}
class HdbinstsKeyFields
{
     String hdbinstsSendNst;
     int hdbinstsSendNstKeyDte;
     String hdbinstsSendIrf;
}
```

As HDBINSTS-KEY-FIELDS is a child variable, it is declared as a POJO variable in HdbinstsParmList, which is HDBINSTS-PARM-LIST's parent. Again HDBINSTS-KEY-FIELDS is a parent variable as it has individual variables declared below it.

The LINKAGE SECTION is another section under Data Division where parameters/values will need to be identified in order to populate passing parameters when calling the execute method of that particular class. It is the passing parameter that should be provided during a program call by the called program. The LINKAGE SECTION will be an independent POJO which will comprise chained declarations of multiple POJOS/variables. Every COBOL program can have one LINKAGE SECTION declaration.

These POJOS are then placed in the copybook package post-transcoding in the Java project structure.

After converting the Data Division there is the Procedure Division. The Procedure Division is the identification for the compiler to understand the position from where the program logic starts.

In this regard, the first paragraph or the line of code which has a COBOL keyword is the beginning of the first paragraph. Each COBOL program is converted into a Java™ package comprising Java™ programs that represent each paragraph of the COBOL program which were not selected to be converted as methods (as described above).

The paragraphs are named as per the mapping in the Logical Excel™ Sheet uploaded during the inventory upload (see Table 4). These logical names are as provided following Java™ standards. The main/first paragraph of the COBOL file is given the same name as the logical name of the COBOL program or the same as the Java™ package name. So to identify the entry point of each program package, we have to identify the Java™ class having the same name as the package name. This Java™ program has all the possible variable declarations done in the COBOL file. None of the rest of the Java™ files in the package have any variable declarations other than its local variables. The rest of the classes in the package are provided the object of the base class to maintain the data flow.

In the conversion settings wizard, all the paragraphs that were selected to be converted as methods will be declared as the Java™ methods under the base class.

When we press the Convert button, a Maven™ supporting project structure is created that is ready to be imported into an integrated development environment (IDE). This task may involve a batch file (written by the development team) that creates a pre-programmed project structure and invoking the batch statement of Maven™ to create the project structure.

After the project is converted, the parser and converter 82 of L2C system 20a generates a compressed file, whose included folders and files together constitute a Java™ project with Maven™ build support and Eclipse™ (IDE) compatibility, as shown in Table 21 below.

TABLE 21

File structure after conversion

| Name | Type |
| --- | --- |
| common | File folder |
| controller | File folder |
| copybooks | File folder |
| programs | File folder |
| sections | File folder |
| util | File folder |

The copybooks folder in Table 21 is populated, by the parser and converter 82, to include all the POJOs created out of the copybooks and the data division(s) of the COBOL file(s) that were converted. The programs folder in Table 21 hold the converted files (i.e., as Java files) of all the selected COBOL programs during execution segregated by directories named after the file names, as shown in exemplary fashion in Table 22 below.

TABLE 22

Java Programs

| Name | Type |
| --- | --- |
| cntrctrulsdbio | File folder |
| criteriatblio | File folder |
| dxgcddb | File folder |
| icd9cddbio | File folder |
| icd10cddata | File folder |
| icd10dxgcd | File folder |
| modcddbio | File folder |
| nonparrtinqryupdt | File folder |
| suspnddenydbio | File folder |

Figure 12:
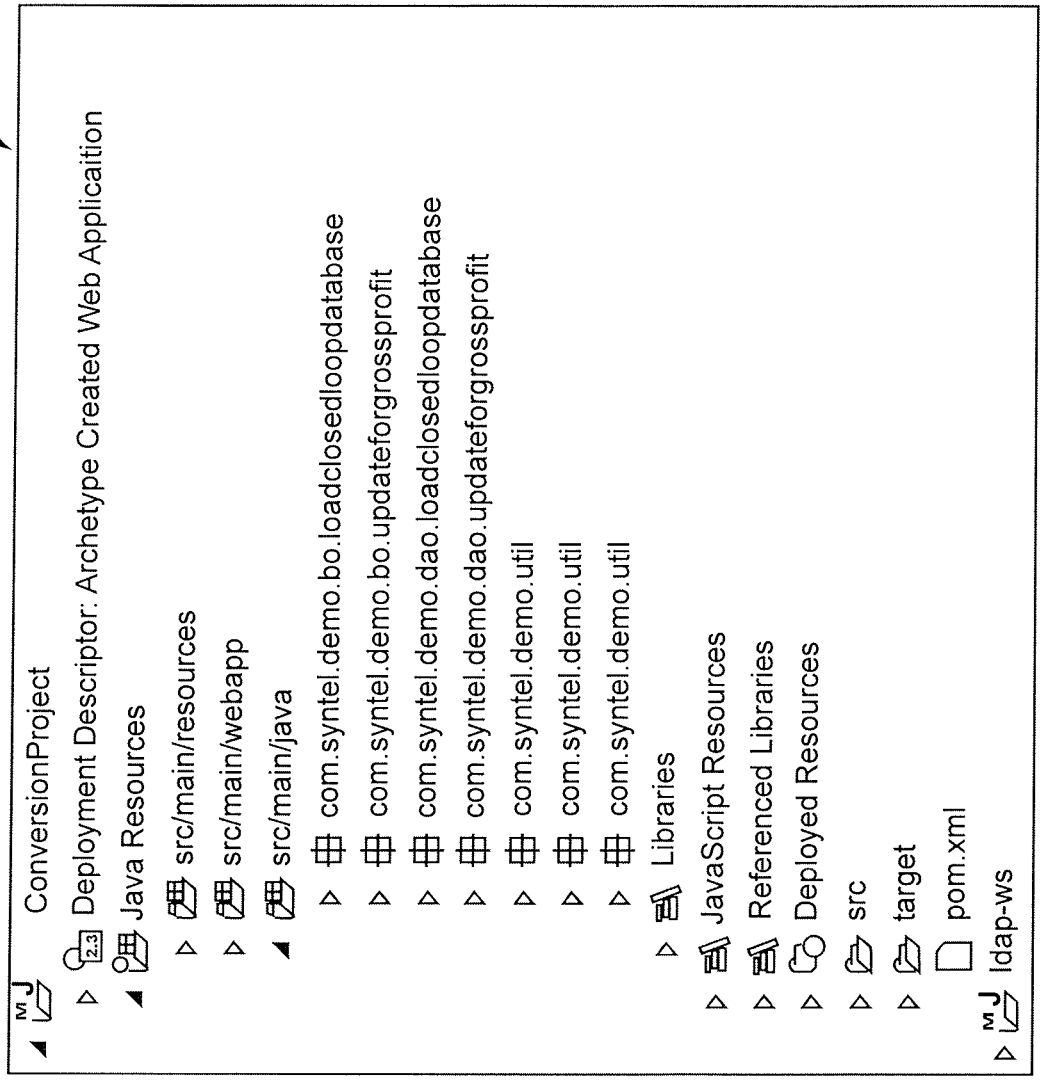
FIG. 12 is a simplified screen display of a project explorer pane of an integrated development environment (IDE) after a converted legacy application has been imported, in an embodiment.

FIG. 12 is a simplified screen display 216 showing an excerpt the contents of a Java™ project (e.g., Table 21) generated by the L2C system 20a after it has been imported into a workspace in the Eclipse™ IDE.

Figure 13:
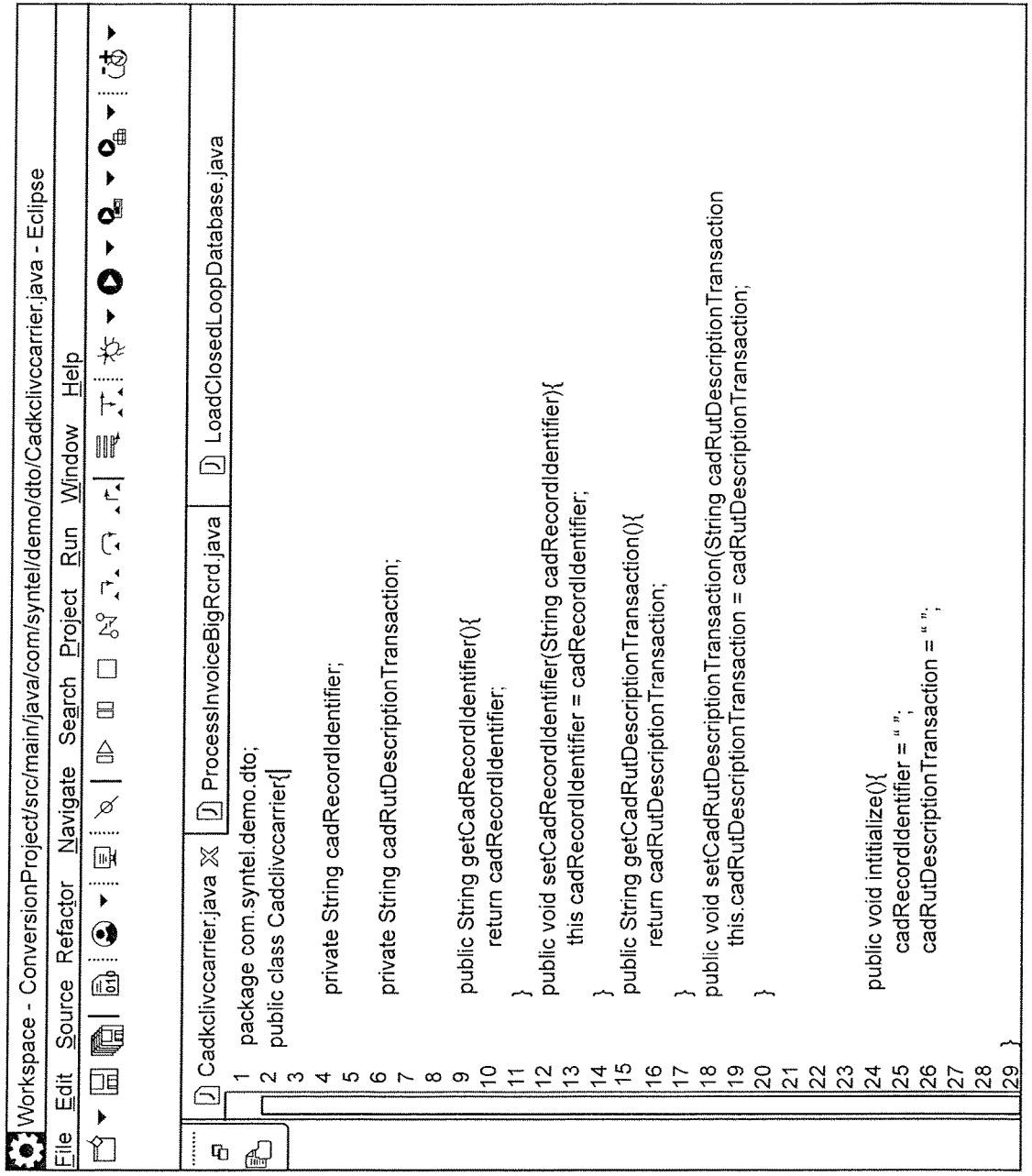
FIG. 13 is simplified screen display showing, in the detail pane of the IDE, a Plain Old Java™ Object (POJO) class as converted from a program variable, in an embodiment.

FIG. 13 is simplified partial screen display 218 showing a POJO class resulting from a legacy conversion, in an embodiment. In particular, the screen display 218 shows a Java™ class Cadkclivccarrier.

Figure 14:
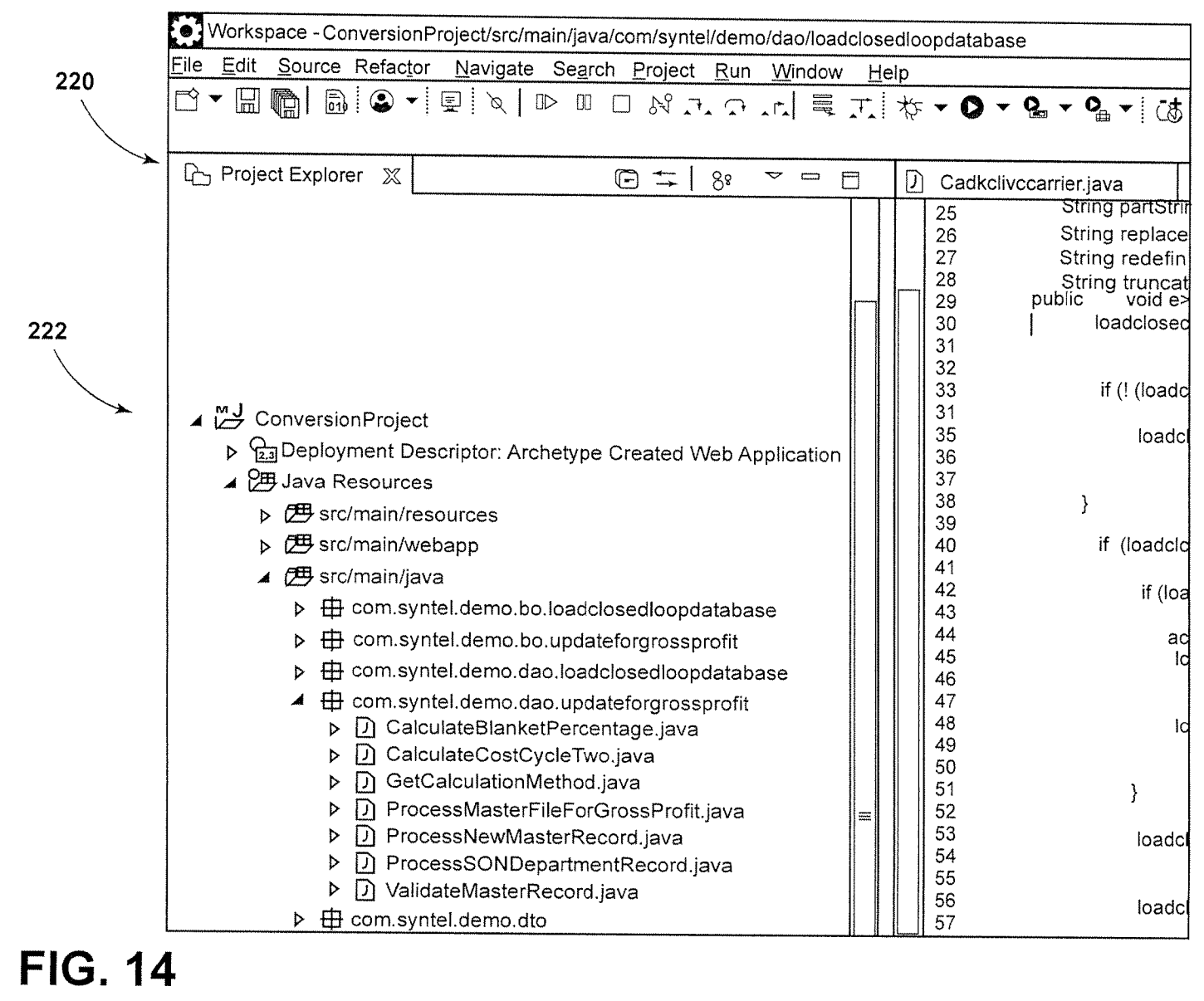
Figure 15:
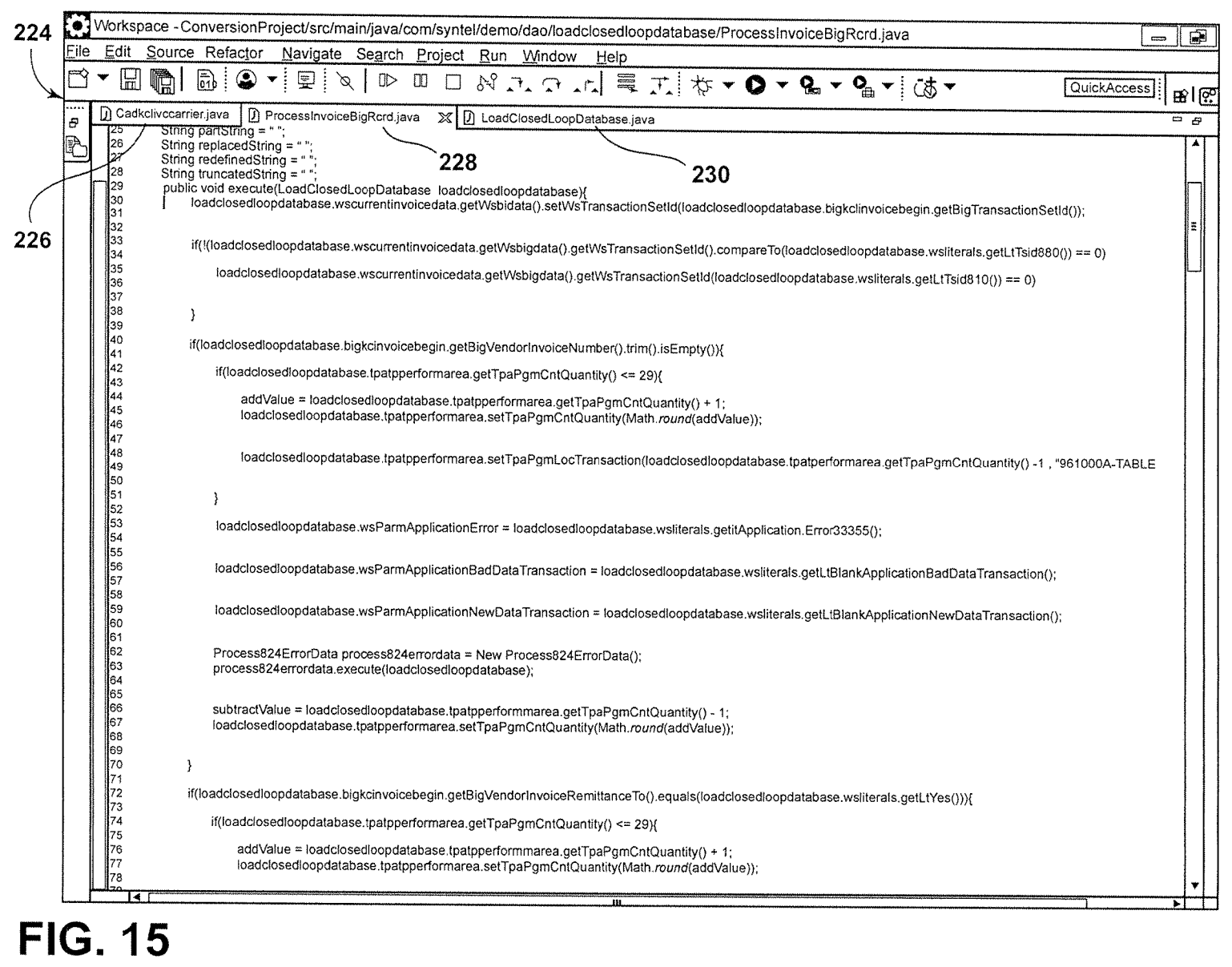
Figure 16:
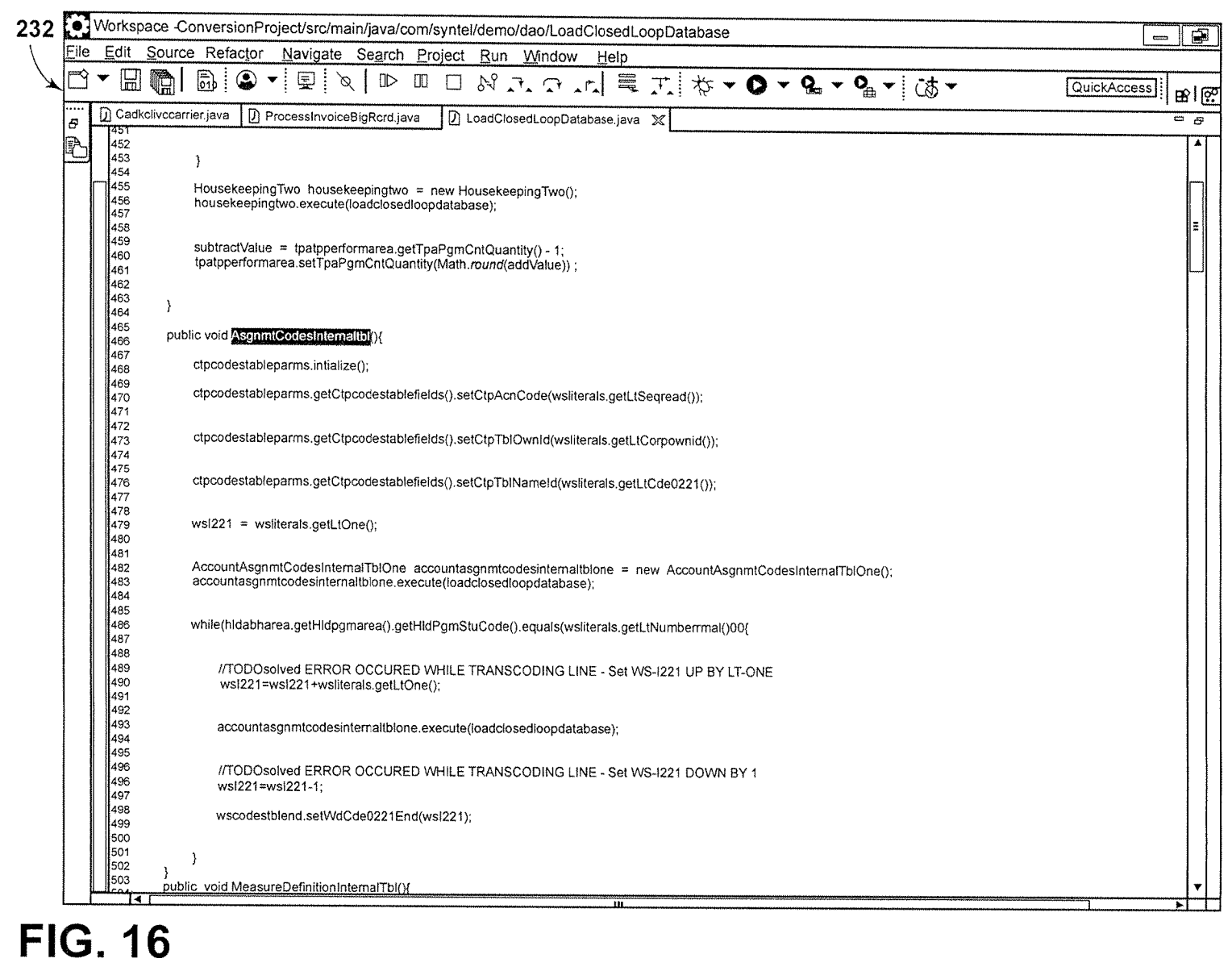

FIGS. 14-15 show legacy application paragraphs converted into Java™ classes while FIG. 16 shows a paragraph converted into a Java™ method. As described above, some of the paragraphs are converted in classes and others are converted into methods.

FIG. 14 shows a screen display 220, which is a simplified, partial excerpt of the screen display of a Java™ project imported into the Eclipse™ IDE that contains, in-part, the paragraphs converted into Java™ class(es), designated by reference numeral 222. In FIG. 14 updateforgrossprofit is the logical name given to the COBOL program. There are two packages with the same name, bo.updateforgrossprofit and dao.updateforgrossprofit. The paragraphs having database transactions are converted and stored in the dao.updatefrogrossprofit package and the other paragraphs which have processing of data is converted and stored in bo.updateforgrossprofit. The paragraphs are given logical name as per their functionality by the SMEs, for example only.

FIG. 15 shows a screen display 224 showing, in greater detail, aspects of the contents in the project explorer portion of the Eclipse™ IDE shown in FIG. 14. In particular, FIG. 15 shows a tab 226 (unselected) of the Java™ class Cadkclivccarrier (POJO) described above in connection with FIG. 13.

FIG. 15 further shows a tab 228 called ProcessInvoiceBigRcrd.java showing a paragraph converted into Java™ class. In the class ProcessInvoiceBigRcrd, the execute method has a parameter of class LoadClosedLoopDatabase—this signifies that the class ProcessInvoiceBigRcrd is a paragraph of the COBOL program that is given the logical name LoadClosedLoopDatabase. FIG. 15 still further shows a tab 230 called LoadClosedLoopDatabase.java that will be described in greater detail in connection with FIG. 16. In FIG. 16, the method AsgnmtCodesInternaltbl( ) is the translation of a COBOL paragraph that was selected to be converted into a method in the conversion settings wizard.

FIG. 16 shows a legacy paragraph converted into a Java™ method. The conversion is performed by the parser and converter 82.

TABLE 23

Source and Target language component mapping

| Source Component | Target Component |
| --- | --- |
| Legacy programs | Java class |
| PARAGRAPH within program | Java class or Java method |
| File | Data Access Object (DAO) |
| File Record Definition | Java POJOs |
| Table | Data Access Object (DAO Data Transfer Object (DTO) |
| COPYBOOK | Java POJOs |
| WORKING STORAGE | Java POJOs Group items: Object Declarations inside Parent POJO Redefines: Java classes |
| MAP | HTML |

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computerized method for language migration of a computer program having first source code in a first, procedural-type programming language to second source code in a second, object-oriented programming language, the method comprising the steps of:

receiving the computer program having the first source code at a processor wherein the first programming language has a hierarchy structure with a plurality of levels wherein a top level element includes at least a sub-element;

parsing the first source code using the processor to identify at least (i) program variables and (ii) program sub-elements in the first source code;

providing a conversion user interface to a user configured to present a listing of the program sub-elements based on the identified program sub-elements and to receive an input at the processor from the user indicating the selection of sub-elements from the listing that are to be converted into methods in the second, object-oriented programming language;

re-architecting the first source code, using the processor, by (i) creating normal object classes in the second source code in the second programming language that correspond to the identified variables, (ii) creating respective program methods in the second source code in the second programming language for the user-selected sub-elements; and (iii) creating respective program classes for a remainder of the listing of sub-elements not selected by the user, wherein the hierarchy structure of the first programming language includes at least divisions, sections, and paragraphs, wherein the sub-element comprises paragraphs, wherein said parsing further comprises parsing the first source code on a paragraph basis,
using the processor, and identifying respective code portions that have a respective degree of match that exceeds a first predetermined threshold, and wherein the method further comprises providing a de-duplication user interface configured to present a listing of duplicate code portions and corresponding degree of match to the user.

2. The method of claim 1 wherein the user interface comprises a conversion settings user interface.

3. The method of claim 2 further comprising selecting a COBOL programming language as the first programming language and a Java programming language as the second programming language.

4. The method of claim 3 wherein creating normal object classes corresponding to the identified variables comprises generating second source code for defining Plain Old Java Object (POJO) classes.

5. The method of claim 3 wherein the user-selected sub-elements comprises user-selected paragraphs, the method further comprising: slicing the first source code on a paragraph by paragraph basis to produce a plurality of paragraph-level portions, and wherein creating program methods comprises converting each paragraph-code portions corresponding to the user-selected paragraphs to the second source code so as to define respective Java methods, and wherein creating program classes comprises converting a remainder of the paragraph-code portions to the second source code so as to define respective Java classes.

6. The method of claim 3, wherein said de-duplication user interface is further configured to cause the processor to receive a selection identifying what duplicate code portion are to be converted into Java common utility classes.

7. The method of claim 6, wherein the processor forms Java extended classes from non-selected duplicate code portions when a degree of similarity of the non-selected duplicate code portions exceeds a second-predetermined threshold relative to the selected duplicate code portions.

8. The method of claim 6, further comprising:
providing a micro services user interface configured to cause the processor to allow the user to select one or more of the common utility classes; and creating, for each selected common utility class, a respective Java micro service.

9. The method of claim 8 further comprising: configuring the microservices to execute as an independent process without being invoked by a parent function.

10. The method of claim 8, wherein configuring the microservice comprises:
presenting to the user an enterprise-level service listing of one or more enterprise-level services and allowing the user to select one of the enterprise-level services to replace a selected one of the common utility classes.

11. The method of claim 3 further comprising:
providing a parallel processing user interface configured to present a listing of candidate processes and to allow the user to select one or more of the candidate processes to be moved into a parallel processing framework.

12. The method of claim 3 further comprising:
converting a map defined in the first source code to a corresponding screen form defined in connection with the second source code.

13. The method of claim 12 wherein the converting a map further comprises:
defining the screen form in a third source code comprising HTML.

14. The method of claim 12, further comprising:
providing a map-refactor user interface configured to refactor the screen form into a rich information architecture (IA) webpage upon user request.

15. The method of claim 3 further comprising:
providing a code elimination user interface configured to cause the processor to allow the user to select at least one of a COBOL source code file and a COPYBOOK file and wherein the code elimination user interface is further configured to cause the processor to allow the user to select one or more lines of code in the selected one COBOL source code file or COPYBOOK file to be eliminated from the re-architecting step.

16. The method of claim 3 further comprising:
providing a database optimizer user interface configured to present to the user candidate mapping from source database schema associated with the first source code to target database schema associated with the second source code and to cause the processor to allow the user to modify the mapping.

17. The method of claim 3 further comprising simulating execution of the computer program in the first source code and analyzing memory and determining an execution flow of the computer program.

18. A computer system comprising:
an electronic processor;
legacy-to-container logic stored in memory for execution by said electronic processor configured for language migration of a computer program having first source code in a COBOL programming language to second source code in a Java programming language, the legacy-to container logic, which when executed by the electronic processor, causes the processor to:
receive the computer program wherein the COBOL programming language has a hierarchy structure with a plurality of levels including at least a paragraph level;
parse the first source code to identify at least (i) variables in the first source code and (ii) paragraphs in the first source code;
provide a conversion-settings user interface to a user configured to present a listing based on the identified paragraphs and to receive an input from the user indicating the selection of paragraphs from the listing that are to be converted into Java methods; and
re-architect the first source code by (i) creating Java POJO classes that correspond to the identified variables, (ii) creating Java methods corresponding to the user-selected paragraphs; and (iii) creating Java classes for a remainder of the paragraph listing not selected by the user,
wherein the hierarchy structure of the COBOL programming language includes at least divisions, sections, paragraphs, and a sub-element comprising paragraphs, wherein said electronic processor is further configured to parse the first source code on a paragraph basis and to identify respective code portions that have a respective degree of match that exceeds a first predetermined threshold, and
wherein said conversion-settings user interface is configured to present a listing of duplicate code portions and corresponding degree of match to the user.

19. The computer system of claim 18 wherein said legacy to container logic is further configured to cause the processor to:
convert a map corresponding to a screen display in the execution of the computer program to a counter-part screen form defined at least in part by HTML code; and provide a map-refactor user interface configured to allow the user to refactor the screen form into a rich information architecture (IA) webpage.

20. The computer system of claim 19 wherein the rich IA webpage comprises at least one of a new label, a new control, and a modification to an existing control.

* * * * *